(12) United States Patent
Kuwatsuka et al.

(10) Patent No.: US 11,111,554 B2
(45) Date of Patent: *Sep. 7, 2021

(54) STABILIZER

(71) Applicant: NHK SPRING CO., LTD., Kanagawa (JP)

(72) Inventors: Shinichiro Kuwatsuka, Kanagawa (JP); Yurika Okudaira, Kanagawa (JP); Akira Tange, Kanagawa (JP); Hideki Okada, Kanagawa (JP); Ken Takahashi, Kanagawa (JP)

(73) Assignee: NHK SPRING CO., LTD., Yokohama (JP)

( * ) Notice: Subject to any disclaimer, the term of this patent is extended or adjusted under 35 U.S.C. 154(b) by 645 days.

This patent is subject to a terminal disclaimer.

(21) Appl. No.: 15/534,472

(22) PCT Filed: Dec. 4, 2015

(86) PCT No.: PCT/JP2015/084217
§ 371 (c)(1),
(2) Date: Jun. 8, 2017

(87) PCT Pub. No.: WO2016/093183
PCT Pub. Date: Jun. 16, 2016

(65) Prior Publication Data
US 2017/0349962 A1    Dec. 7, 2017

(30) Foreign Application Priority Data

Dec. 8, 2014  (JP) .............................. JP2014-248328

(51) Int. Cl.
*C21D 9/00* (2006.01)
*B21D 47/00* (2006.01)
(Continued)

(52) U.S. Cl.
CPC .......... *C21D 9/0068* (2013.01); *B21D 47/00* (2013.01); *B21D 53/88* (2013.01); *B24C 1/10* (2013.01);
(Continued)

(58) Field of Classification Search
CPC .......... B21D 47/00; B21D 53/88; B24C 1/10; B60G 21/055; B60G 2206/427;
(Continued)

(56) References Cited

U.S. PATENT DOCUMENTS 4,526,628 A * 7/1985 Ohno ..................... B23P 15/00
                                                    148/520
2005/0029722 A1   2/2005 Reichel
(Continued)

FOREIGN PATENT DOCUMENTS

CN        1564759      1/2005
CN      102317493      1/2012
(Continued)

OTHER PUBLICATIONS

Michael F. Ashby Chapter 13—Steels 2 Alloy steels Engineering Materials 2 (Fourth edition) 2013 pp. 221-236 (Year: 2013).*
(Continued)

*Primary Examiner* — Jenny R Wu
(74) *Attorney, Agent, or Firm* — Martin & Ferraro, LLP

(57) ABSTRACT

A stabilizer formed by using a metal bar having a solid structure and configured to reduce a displacement between right and left wheels, including a torsion part extending in a vehicle width direction, being capable of a torsional deformation, and having a diameter of 10 to 32 mm, is provided. The stabilizer has a chemical composition containing at least C: 0.15% by mass or more to 0.39% by mass or less, Mn, B, and Fe, and also has a metal structure 90% or more of which is a martensite structure.

3 Claims, 14 Drawing Sheets

(51) Int. Cl.

| | | |
|---|---|---|
| *C22C 38/42* | (2006.01) | |
| *C22C 38/04* | (2006.01) | |
| *C22C 38/02* | (2006.01) | |
| *C22C 38/00* | (2006.01) | |
| *C22C 38/44* | (2006.01) | |
| *B21D 53/88* | (2006.01) | |
| *C21D 8/06* | (2006.01) | |
| *C21D 7/06* | (2006.01) | |
| *C21D 6/00* | (2006.01) | |
| *C21D 1/60* | (2006.01) | |
| *B60G 21/055* | (2006.01) | |
| *B24C 1/10* | (2006.01) | |
| *C22C 38/54* | (2006.01) | |
| *F16F 1/14* | (2006.01) | |
| *C22C 38/60* | (2006.01) | |
| *C21D 9/02* | (2006.01) | |

(52) U.S. Cl.
CPC ............ *B60G 21/055* (2013.01); *C21D 1/60* (2013.01); *C21D 6/004* (2013.01); *C21D 6/005* (2013.01); *C21D 6/008* (2013.01); *C21D 7/06* (2013.01); *C21D 8/065* (2013.01); *C21D 9/0075* (2013.01); *C21D 9/02* (2013.01); *C22C 38/00* (2013.01); *C22C 38/002* (2013.01); *C22C 38/02* (2013.01); *C22C 38/04* (2013.01); *C22C 38/42* (2013.01); *C22C 38/44* (2013.01); *C22C 38/54* (2013.01); *C22C 38/60* (2013.01); *F16F 1/14* (2013.01); *B60G 2206/427* (2013.01); *B60G 2206/724* (2013.01); *B60G 2206/81035* (2013.01); *B60G 2206/8402* (2013.01); *B60G 2206/8403* (2013.01); *C21D 2211/008* (2013.01)

(58) Field of Classification Search
CPC .... B60G 2206/724; B60G 2206/81035; B60G 2206/8402; B60G 2206/8403; C21D 1/60; C21D 2211/008; C21D 6/004; C21D 6/005; C21D 6/008; C21D 7/06; C21D 8/065; C21D 9/0068; C21D 9/0075; C21D 9/02; C22C 38/00; C22C 38/002; C22C 38/02; C22C 38/04; C22C 38/42; C22C 38/44; C22C 38/54; C22C 38/60; F16F 1/14

See application file for complete search history.

(56) References Cited

U.S. PATENT DOCUMENTS

| | | |
|---|---|---|
| 2006/0243355 A1 | 11/2006 | Haiderer |
| 2011/0290382 A1 | 12/2011 | Kikuchi et al. |
| 2012/0318409 A1 * | 12/2012 | Mizuno ............... B60G 21/055 148/506 |
| 2013/0093153 A1 | 4/2013 | Ito |
| 2013/0118649 A1 | 5/2013 | Hirata |
| 2014/0060709 A1 | 3/2014 | Tange et al. |
| 2017/0021691 A1 | 1/2017 | Tange et al. |
| 2017/0130288 A1 | 5/2017 | Fukuoka et al. |
| 2017/0174030 A1 * | 6/2017 | Mori ..................... C09D 127/18 |

FOREIGN PATENT DOCUMENTS

| | | |
|---|---|---|
| CN | 102782172 | 11/2012 |
| CN | 103518000 | 1/2014 |
| EP | 1 905 857 A2 | 4/2008 |
| EP | 3124638 A1 | 2/2017 |
| JP | 01004424 | 1/1989 |
| JP | H11-323495 A | 11/1999 |
| JP | 2000-017390 A | 1/2000 |
| JP | 2005-002365 A | 1/2005 |
| JP | 2006-089783 A | 4/2006 |
| JP | 2006-089785 A | 4/2006 |
| JP | 2006089783 A * | 4/2006 |
| JP | 2006089785 A * | 4/2006 |
| JP | 2007-217736 A | 8/2007 |
| JP | 2009-072806 A | 4/2009 |
| JP | 4406341 B2 | 1/2010 |
| JP | 2010-185109 A | 8/2010 |
| JP | 2011-189892 A | 9/2011 |
| JP | 2011-196491 A | 10/2011 |
| JP | 2012-237040 A | 12/2012 |
| KR | 10-2013-0140182 | 12/2013 |
| WO | WO2011/111623 A | 6/2011 |

OTHER PUBLICATIONS

AISI 1021 Chemical Compositions, AISI 1021 Mechanical Properties, AISI 1021 Heat Treatment.*

1st Office Action on JP2014-248328 dated Feb. 1, 2016, Japanese Patent Office, 7 pgs.

2nd Office Action on JP2014-248328 dated Aug. 24, 2016, Japanese Patent Office, 3 pgs.

Office Action received Sep. 12, 2019 in EPO counterpart Application No. 15868473.

Olivier Rod: "Opportunities and dangers of using residual elements in steels: a literature survey", Dec. 7, 2006 (Dec. 7, 2006), XP055468670, United States; ISBN: 978-92-1-116634-7; Retrieved from the internet: URL: http://www.jemkontoret.se/globalassets/publicerat/forskning/d-rapporter/d819.pdf [retrieved on Apr. 19, 2018].

Supplementary European Search Report for EP 15868473, European Patent Office, dated Apr. 23, 2018, 12 pgs.

* cited by examiner

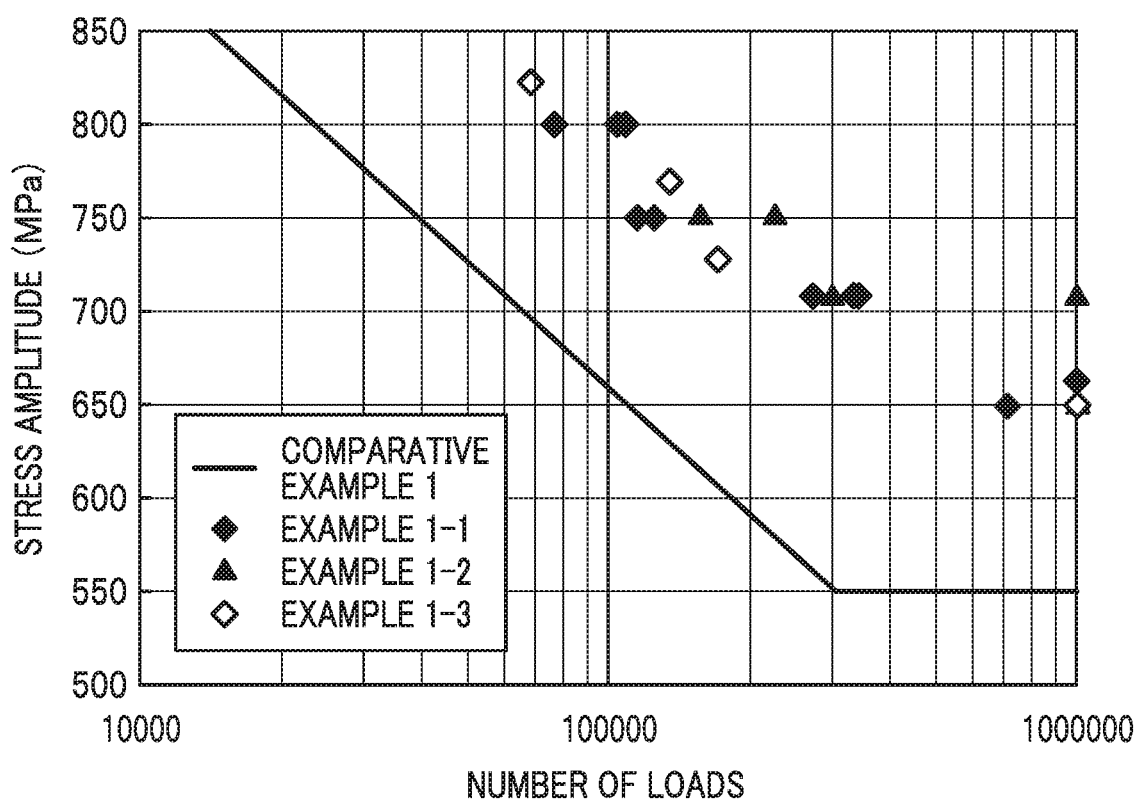

STABILIZER

This is a National Phase Application under 35 USG 371 of PCT/JP2015/084217 filed Dec. 4, 2015 (published on Jun. 16, 2016 as WO 2016/093183); which claims priority to Japanese Application No, 2014-248328 filed Dec. 8, 2014; all of which are incorporated by reference herein in their entirety.

TECHNICAL FIELD

The present invention relates to a stabilizer having a solid structure.

BACKGROUND ART

A vehicle such as an automobile includes a vehicle stabilizer (stabilizer bar or anti-roll bar) configured to reduce rolling of the vehicle body due to vertical movements of the wheels. Commonly, a vehicle stabilizer is a substantially U-shaped bar including a torsion part extending in a vehicle width direction, and a pair of right and left arm parts bent in a vehicle front-rear direction. In a vehicle, a vehicle stabilizer is suspended and supported between the right and left suspension devices with tip ends of the arm parts respectively connected to suspension devices of wheels, and the torsion part inserted in bushes fixed to the vehicle body.

During driving, when a vehicle turns at a corner or runs over a bump on the road surface, a stroke difference between the right and left suspension devices occurs depending on a vertical positional difference between the right and left wheels. In this event, the arm parts of the vehicle stabilizer respectively receive loads (thus are displaced) due to the stroke difference between the suspension devices, and the torsion part is twisted by a load (displacement difference) from each arm part. Subsequently, an elastic force is generated to recover the torsional deformation. By utilizing this elastic force for the recovery from the torsional deformation, the vehicle stabilizer reduces the vertical displacement difference between the right and left wheels, increases the roll stiffness of the vehicle body, and reduces rolling of the vehicle body.

In terms of the forms of vehicle stabilizers, there are a hollow stabilizer having a hollow structure and a solid stabilizer having a solid structure. A hollow stabilizer has characteristics of being suited to reduce the weight of a vehicle, but requiring relatively high production cost because an electro-welded steel pipe, a drawn steel pipe, or the like is used as the raw material. In contrast, a solid stabilizer has advantages in that the mechanical strength is excellent and the production cost is low.

Conventionally, carbon steels such as S48C (JIS) and spring steels such as SUP9 (JAPANESE INDUSTRIAL STANDARD) and SUP9A (JAPANESE INDUSTRIAL STANDARD) having favorable fatigue resistances and mechanical strengths such as tensile strength have been commonly adopted as materials of vehicle stabilizers. Solid stabilizers are often produced by shaping hot rolled steel bars or cold drawn steel bars made of such materials into the final product forms by hot bending process or cold bending process, and subjecting the bent workpieces to heat treatment. As the heat treatment, a quenching treatment and a tempering treatment are performed. A major quenching method is oil quenching. Moreover, the half-finished products of vehicle stabilizers after the heat treatment are usually formed into the final products through a surface treatment by shot peening and a finishing treatment such as painting.

Shot peening is one of plastic deformation processes, and performed mainly to impart a compressive residual stress to an outer layer of a vehicle stabilizer. Imparting a compressive residual stress to an outer layer of a vehicle stabilizer enhances the fatigue strength and improves the crack resistance, crack propagation, and so forth, so that it is possible to obtain a vehicle stabilizer having a favorable fatigue durability. Moreover, by performing shot peening, the surface of half-finished product of a vehicle stabilizer can be smoothen to reduce the number of crack origins and to turn into a state suitable for paint adhesion, too.

As a technique of performing shot peening on an outer layer of a vehicle stabilizer as described above, for example, Patent Literature 1 discloses a technique of performing shot peening once or at least twice after tempering in a method for producing a high-strength stabilizer. In the method, a steel base material containing, in terms of weight, C: 0.45 to 0.70%, Si: 1.20 to 2.50%, Mn: 0.10 to 0.80%, and Cr: 0.10 to 0.80%, and further containing at least one of V: 0.05 to 0.25%, Ni: 0.10 to 0.80%, B: 0.001 to 0.003%, and Ti: 0.01 to 0.05% is formed into a predetermined shape. Then, the material is heated by electrical heating at a rate of 25° C./second or more to a range of 900° C. to 1000° C., followed by rapid cooling for the quenching. Thereafter, the tempering is performed so that the resultant hardness becomes HRC 45 or more (see claim 3 and so forth).

For example, the first shot peening uses shot particles having diameters of 0.8 mm or more, and the second and subsequent shot peening uses shot particles having diameters not larger than the diameters of the shot particles used in the first shot peening (see paragraph 0011 and so forth).

In recent years, the demand has been high for stabilizer production near vehicle manufacturers that newly construct or transfer production bases strategically. Hence, recently, compact production lines for stabilizers have been strongly demanded.

CITATION LIST

Patent Literature

Patent Literature 1: JP 2005-002365 A

SUMMARY OF INVENTION

Technical Problems

From the viewpoint of enhancing the crack propagation resistance of a vehicle stabilizer, it is desirable to impart a compressive residual stress which is more deeply distributed to the vehicle stabilizer. However, when shot peening using shot materials having large diameters is performed to impart a deep compressive residual stress, it is necessary to smooth the surface of the vehicle stabilizer by performing shot peening twice or more using shot materials having small diameters in combination as described in Patent Literature 1. Hence, due to the restrictions of the treatment time and the number of man-hours involved in the shot peening process, it is currently difficult to impart a compressive residual stress which is sufficiently deeply distributed.

Moreover, such a deeply distributed compressive residual stress is desirably imparted as uniformly as possible to the surface of a vehicle stabilizer. This is because if a compressive residual stress imparted is locally less, a possibility of a crack being generated from that region cannot be completely eliminated. Nevertheless, recently, structures around suspension devices of vehicles have become more complicated. Along with this, vehicle stabilizers have a wider variety of shapes around bent portions. Further, there is a case where a bush-attached portion of a torsion part is recessed to form a narrow region which shot materials hardly reach. For these reasons, it is now harder and harder to uniformly impart a compressive residual stress which is deeply distributed to a wide region of an outer layer of a vehicle stabilizer by shot peening.

In addition, having to install a conventional long and large tempering furnace is a great burden in terms of cost and place for creating a new production line. Moreover, the environmental load of waste oils after oil quenching is not small, and thus a high disposal cost is required. This serves as one cause of decreasing the production efficiency of stabilizers.

Accordingly, an object of the present invention is to provide a low-cost stabilizer enhanced in fatigue durability with a deeply distributed compressive residual stress imparted to an outer layer of the stabilizer.

Solution to Problems

To solve the above problem, a first stabilizer of the present invention is characterized as follows. Specifically, the first stabilizer is formed by using a metal bar having a solid structure and configured to reduce a displacement between right and left wheels. The stabilizer includes a torsion part extending in a vehicle width direction, being capable of a torsional deformation, and having a diameter of 10 to 32 mm. The stabilizer has a chemical composition containing at least C: 0.15% by mass or more to 0.39% by mass or less, Mn, B, and Fe, and also has a metal structure 90% or more of which is a martensite structure.

A second stabilizer of the present invention is characterized as follows. Specifically, the second stabilizer is formed by using a metal bar having a solid structure and configured to reduce a displacement between right and left wheels. The stabilizer includes a torsion part extending in a vehicle width direction, being capable of a torsional deformation, and having a diameter of 10 to 32 mm. The stabilizer has a chemical composition containing at least C: 0.15% by mass or more to 0.39% by mass or less, Mn, B, and Fe, and also has a metal structure whose main phase is martensite. After quenching, the stabilizer is not subjected to at least one of tempering and shot peening.

A third stabilizer of the present invention is characterized as follows. Specifically, the third stabilizer is formed by using a metal bar having a solid structure and configured to reduce a displacement between right and left wheels. The stabilizer includes a torsion part extending in a vehicle width direction, being capable of a torsional deformation, and having a diameter of 10 to 32 mm. The stabilizer has a chemical composition containing at least C: 0.15% by mass or more to 0.39% by mass or less, Mn, B, and Fe, and also has a metal structure whose main phase is martensite. A compressive residual stress is imparted near the stabilizer surface. A crossing point where the compressive residual stress changes over to a tensile residual stress is located deeper than a depth of 0.8 mm from the surface.

Advantageous Effects of Invention

The present invention makes it possible to provide a low-cost stabilizer enhanced in fatigue durability with a deeply distributed compressive residual stress imparted to an outer layer of the stabilizer.

BRIEF DESCRIPTION OF DRAWINGS

FIG. 8 shows an S-N curve of vehicle stabilizers according to Examples;

DESCRIPTION OF EMBODIMENTS

Hereinafter, vehicle stabilizers according to embodiments of the present invention will be described using the drawings. Note that constituents common among the drawings are denoted and shown by the same reference signs, and the overlapping descriptions will be omitted.

Figure 1:
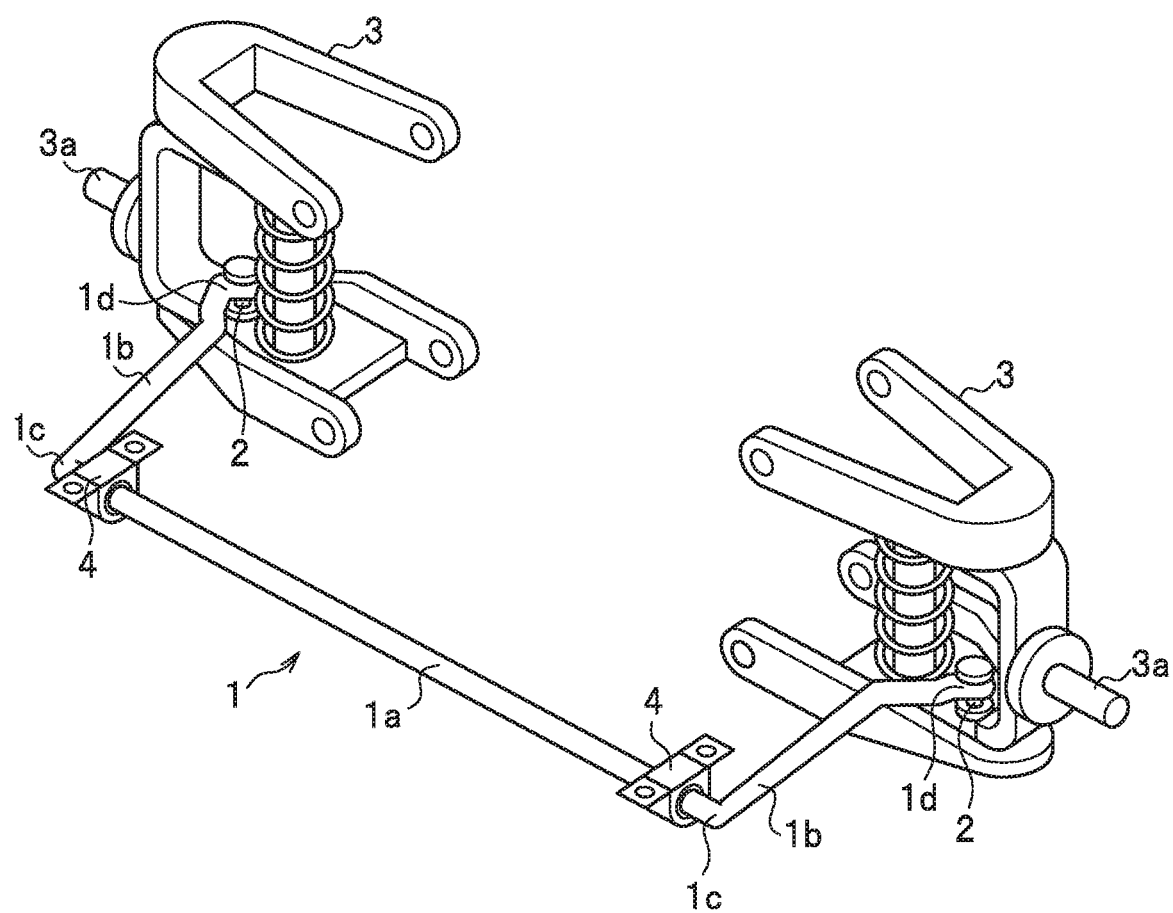
FIG. 1 is a perspective view showing one example of a vehicle stabilizer according to an embodiment of the present invention.

FIG. 1 is a perspective view showing one example of a vehicle stabilizer according to an embodiment of the present invention.

A vehicle stabilizer 1 according to the embodiment includes: a torsion part 1a extending in a vehicle width direction; and a pair of right and left arm parts 1b, 1b extending in a vehicle front-rear direction.

The vehicle stabilizer 1 has a substantially U-shaped base body which is bent at bent portions 1c, 1c symmetrically located at two ends of the torsion part 1a extending in the vehicle width direction, and which is continuous with the pair of right and left arm parts 1b, 1b.

Note that the term base body means the main body part of the vehicle stabilizer 1 formed of a steel bar having been subjected to a predetermined processing.

The vehicle stabilizer 1 is formed by using a bar-shaped steel bar material (metal bar) having a solid structure. The torsion part 1a has a diameter of approximately 10 mm to approximately 32 mm.

Tip ends of the arm parts 1b, 1b have plate-shaped connection portions (eye portions) 1d, 1d which serve as attachment portions. The connection portions (eye portions) 1d, 1d are formed into plate shapes having attachment holes by forging, pressing, or the like.

The connection portions 1d, 1d at the tip ends of the arm parts 1b, 1b are respectively connected to paired right and left suspension devices 3, 3 with stabilizer links 2, 2. The suspension devices 3, 3 are fixed to an unillustrated vehicle body. An unillustrated wheel is attached to an axle portion 3a of each of the suspension devices 3. The suspension device 3 has a compressive spring and an oil damper, and acts to attenuate an impact, a vibration, and the like from the wheel, and transmit the force thus mitigated to the vehicle body.

The torsion part 1a is inserted in rubber-made bushes 4 fixed to an unillustrated cross member and so on of the vehicle body, and suspended between the right and left suspension devices 3, 3.

With this configuration, when a stroke difference between the right and left suspension devices 3, 3 occurs depending on vertical movements of right and left wheels, loads due to the displacement are transmitted from the suspension devices 3, 3 to the arm parts 1b, 1b. Thereby, the torsion part 1a is twisted and deformed. Then, the torsion part 1a generates an elastic force for the recovery from the torsional deformation. The vehicle stabilizer 1 utilizes this elastic force against the torsional deformation to suppress rightward and leftward tiltings of the vehicle body, thereby increasing the roll stiffness and stabilizing the running of the vehicle.

The base body of the vehicle stabilizer 1 including the torsion part 1a and the arm parts 1b, 1b has a solid structure, which is a steel bar.

The base body of the vehicle stabilizer 1 has a chemical composition containing at least carbon (C): 0.15% by mass or more to 0.39% by mass or less, manganese (Mn), boron (B), and iron (Fe), and is formed of a metal structure whose main phase is martensite.

Meanwhile, if a tensile stress remains, this promotes crack formation and propagation, so that the material is likely to be fractured soon. In contrast, a compressive residual stress, if any, can increase the lifetime because of the crack reducing effect. The residual stress has a close relation with the lifetime of metal materials. Particularly, the influence is remarkable on metal fatigue in which a crack gradually propagates by repeated loads.

Hence, the base body of the vehicle stabilizer 1 has an outer layer to which a suitable compressive residual stress is imparted. To be more specific, in the vehicle stabilizer 1, a crossing point where the compressive stress changes over to a tensile stress is located deeper than a depth of 0.8 mm from the surface of the base body. This compressive residual stress is characterized by being imparted not by plastic deformation processes such as shot peening but by quenching of heating without tempering.

In the vehicle stabilizer 1, the compressive residual stress ranging over the entire region of the base body and distributed to the deep position from the surface can be imparted by quenching under a predetermined condition. Specifically, in the production process of the vehicle stabilizer 1, the compressive residual stress can be imparted by subjecting a steel bar material, which is the raw material of the base body, to the quenching under the predetermined condition where a thermal stress predominates over a transformation stress. When the steel material is quenched, a compressive residual stress attributable to a thermal stress and a tensile residual stress attributable to a transformation stress are generated as described below. Depending on a balance between these, the surface residual stress exhibits a predetermined distribution.

Figure 2A:
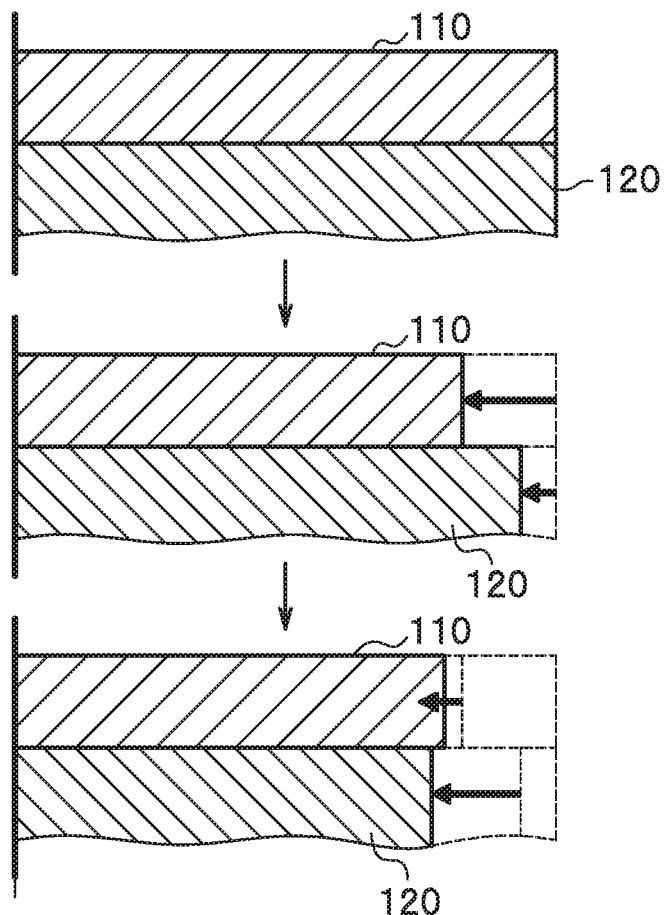
FIG. 2A shows conceptual drawings for illustrating a mechanism of generating a residual stress attributable to a thermal stress and also illustrating the deformation process accompanying cooling.
Figure 2B:
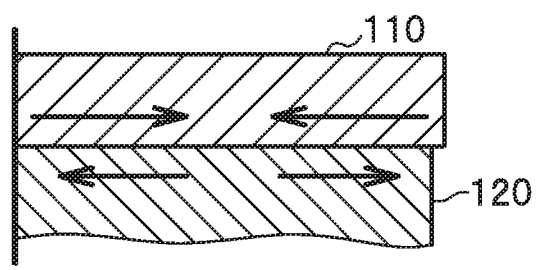
FIG. 2B is a conceptual drawing for illustrating the mechanism of generating a residual stress attributable to a thermal stress, showing the residual stress after plastic deformation.

FIG. 2A shows conceptual drawings for illustrating a mechanism of generating a residual stress attributable to a thermal stress and also illustrating the deformation process accompanying cooling. FIG. 2B is a conceptual drawing for illustrating the mechanism of generating a residual stress attributable to a thermal stress, showing the residual stress after plastic deformation. FIGS. 2A and 2B schematically show changes in structure volumes in the vicinity of the surface of a steel material. Reference sign 110 denotes a surface structure present at a surface side of the steel material, and reference sign 120 denotes an internal structure present at an inner side of the steel material.

A thermal stress generated by quenching exhibits a distribution where, as a time elapses, a thermal contraction of a cooled steel material changes in a depth direction of the steel material due to a difference in cooling rate in the depth direction. Normally, quenching heats a steel material including the inner side up to the transformation temperature or higher, and substantially no stress and strain are observed in the surface structure 110 and the internal structure 120 as shown in the upper part of FIG. 2A. From this state, when the steel material is cooled and quenched, the cooling of the steel material progresses from the surface structure 110 side to the internal structure 120 as a time elapses, creating a cooling rate difference between the surface side and the inner side. Hence, as shown in the middle part of FIG. 2A, the surface structure 110 side thermally contracts more greatly than the internal structure 120 side where the thermal conduction delays. Along with the contraction deformation of the surface structure 110 side, the internal structure 120 side where the thermal conduction delays is subjected to plastic deformation and contracted.

Further, as shown in the lower part of FIG. 2A, as a time elapses and the cooling progresses, the solidification of the metal structure ends at the surface structure 110 side and the dimensional change no longer occurs. In contrast, at the internal structure 120 side where the thermal conduction delays, the cooling and the thermal contraction still progresses. Then, the internal structure 120 continuing the thermal contraction completes the plastic deformation contraction while restricting the surface structure 110 in the contraction direction. As a result, as shown in FIG. 2B, the surface structure 110 side receives a contraction force from the internal structure 120, so that the residual stress exhibits a distribution where the compressive residual stress predominates in the depth direction. On the other hand, since the internal structure 120 receives a stretching force from the surface structure 110, a distribution is exhibited where the tensile residual stress predominates in the depth direction.

Figure 3A:
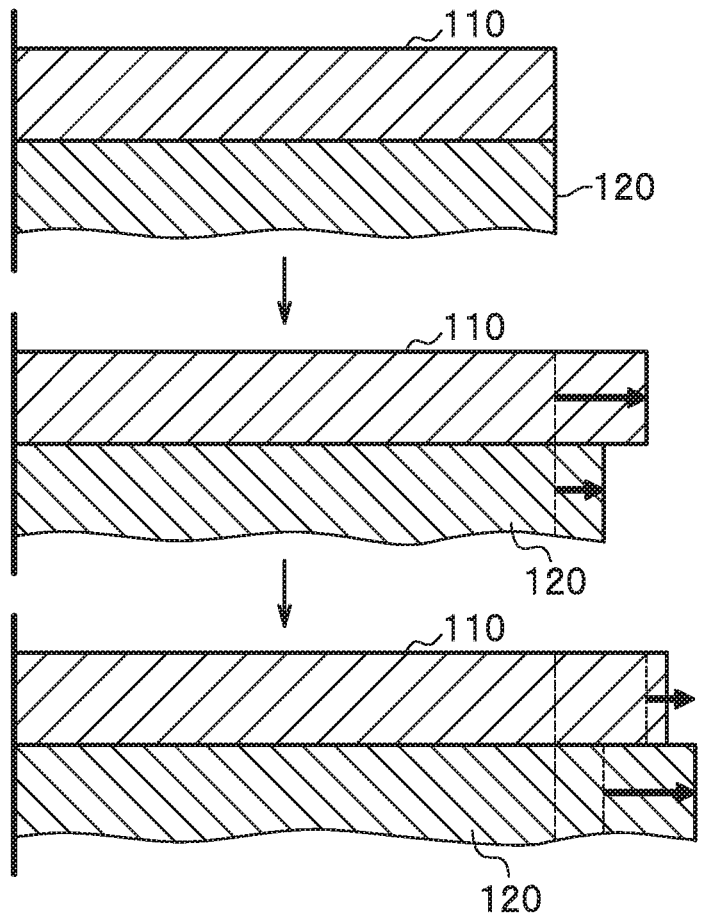
FIG. 3A shows conceptual drawings for illustrating a mechanism of generating a residual stress attributable to a transformation stress and also illustrating the deformation process accompanying martensite transformation.
Figure 3B:
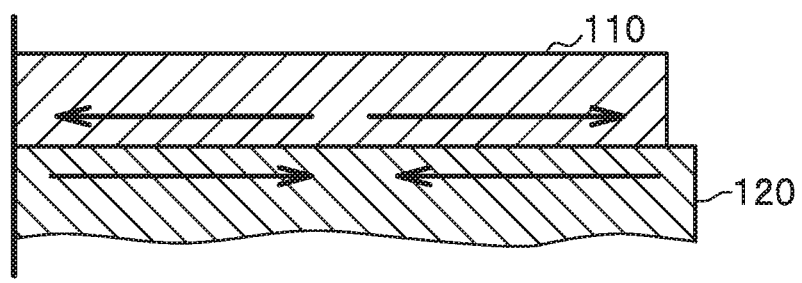
FIG. 3B is a conceptual drawing for illustrating the mechanism of generating a residual stress attributable to a transformation stress, showing the residual stress after plastic deformation.

FIG. 3A shows conceptual drawings for illustrating a mechanism of generating a residual stress attributable to a transformation stress and also illustrating the deformation process accompanying martensite transformation. FIG. 3B is a conceptual drawing for illustrating the mechanism of generating a residual stress attributable to a transformation stress, showing the residual stress after plastic deformation. Like FIGS. 2A and 2B, FIGS. 3A and 3B schematically show changes in structure volumes in the vicinity of the surface of a steel material. Reference sign 110 denotes a surface structure present at a surface side of the steel material, and reference sign 120 denotes an internal structure present at an inner side of the steel material.

However, a transformation stress generated in the metal structure by quenching exhibits a distribution in a direction opposite to the thermal stress, where the expansion attributable to the martensite transformation of the cooled steel material is restricted or enhanced due to a difference in cooling rate in the depth direction of the steel material.

Substantially no stress and strain are observed in the surface structure 110 and the internal structure 120 shown in the upper part of FIG. 3A. From this state, when the steel material is quenched, the cooling of the steel material progresses from the surface structure 110 side, creating a cooling rate difference between the surface side and the inner side. Hence, as shown in the middle part of FIG. 3A, the surface structure 110 side becomes lower than a martensite-transformation starting temperature (Ms) faster than the internal structure 120 side where the thermal conduction delays, and greatly expands accompanying the martensite transformation. In contrast, the internal structure 120 side where the thermal conduction delays is pulled and subjected to plastic deformation along with the surface structure 110 side.

Further, as shown in the lower part of FIG. 3A, as a time elapses and the cooling progresses, the surface structure 110 side becomes lower than a martensite-transformation finishing temperature (Mf) faster than the internal structure 120 side where the thermal conduction delays, and the change in volume of the metal structure ends. In contrast, the internal structure 120 side where the thermal conduction delays still expands accompanying the martensite transformation in a temperature range from the martensite-transformation starting temperature (Ms) or more to the martensite-transformation finishing temperature (Mf) or less. Then, the internal structure 120 continuing the expansion completes the plastic deformation while restricting the surface structure 110 in the tensile direction. As a result, a residual stress is generated as shown in FIG. 3B, so that the surface structure 110 is pulled by the expansion of the internal structure 120, and the tensile residual stress predominates toward the surface structure 110. On the other hand, the internal structure 120 receives a compressive force from the surface structure 110, so that the compressive residual stress predominates toward the internal structure 120. From the above, the transformation stress exhibits a distribution in the direction opposite to the thermal stress.

In order to achieve uniform mechanical properties to a deep portion in the vehicle stabilizer 1, it is desirable to sufficiently increase the quenching depth, and to have martensite as the main phase of the metal structure including a central portion of the traverse cross section. Hence, the transformation stress cannot be reduced greatly. Thus, in order that a thermal stress predominates over a transformation stress, it is preferable to select such a quenching condition that the cooling rate is fast enough to generate the thermal stress.

For this reason, in producing the vehicle stabilizer 1, quenching is performed using a medium having a heat transfer coefficient equal to or higher than that of water or close to that of water. In addition, as the base body of the vehicle stabilizer 1, a manganese-boron steel (Mn—B steel) is adopted which contains Mn and B and has a favorable hardenability compared to conventionally-used spring steels. This is because if a steel material has a poor hardenability, quenching at a fast cooling rate increases the risk of generating a strain and a quenching crack.

In detail, the base body of the vehicle stabilizer 1 is determined to have a low carbon content of 0.15% by mass or more to 0.39% by mass or less because strength and toughness are demanded.

From the above, the raw material of the vehicle stabilizer 1 is constituted of a steel type having a low carbon content among manganese-boron steels, and has a chemical composition containing at least carbon (C): 0.15% by mass or more to 0.39% by mass or less, manganese (Mn), boron (B), and iron (Fe). When a carbon amount is within such a low content range from 0.15% by mass or more to 0.39 by mass or less, the vehicle stabilizer 1 thus obtained has a favorable toughness even in the quenched state, season cracking is inhibited after the quenching, and the corrosion resistance is also excellent. As described later, Mn is preferably 0.50% or more to 1.70% or less, and B (boron) is preferably 0.0005% or more to 0.003% or less.

The base body of the vehicle stabilizer 1 more preferably contains, in terms of mass, C: 0.15% or more to 0.39% or less, Si: 0.05% or more to 0.40% or less, Mn: 0.50% or more to 1.70% or less, and B: 0.0005% or more to 0.003% or less as essential elements, and P: 0.040% or less and S: 0.040% or less, and may optionally contain at least one or more elements selected from the group consisting of Ni, Cr, Cu, Mo, V, Ti, Nb, Al, N, Ca, and Pb each within a range of 1.20% or less as optional additive elements; and the balance includes Fe and unavoidable impurities. Specifically, a 15B23-equivalent steel or a 15B26-equivalent steel in Standard American Engineering grades system is readily available and preferable as the raw material of the vehicle stabilizer 1.

When the steel bar material used as the raw material of the vehicle stabilizer 1 has a chemical composition containing no optional additive element, the steel bar material having a favorable hardenability can be obtained at a low material cost, so that the vehicle stabilizer 1 can be produced at low cost. On the other hand, when the chemical composition contains an optional additive element(s), properties of the steel bar material can be improved depending on the element type. In the chemical composition containing an optional additive element(s), the balance other than the essential elements, the optional additive element(s), and P and S regarded as unavoidable impurities includes Fe and the other unavoidable impurities.

Component Elements Contained in Vehicle Stabilizer 1

Hereinafter, description will be given of each component element of the steel bar material used as the raw material of the vehicle stabilizer 1.

Carbon (C) is a component contributing to, for example, enhancements of mechanical strength and hardness. When C is 0.15% by mass or more, favorable mechanical strength and hardness can be ensured, and such C content makes the quenching hardness superior to conventional spring steels. Note that the fatigue strength of the vehicle stabilizer 1 is substantially proportional to the hardness.

On the other hand, when C is 0.39% by mass or less, the mechanical strength and a predetermined toughness can be ensured after quenching. Moreover, such C content inhibits quenching crack due to a transformation stress or the like and season cracking due to retained austenite, and can suppress a decrease in corrosion resistance due to carbide precipitation. The C content is more preferably 0.18% by mass or more to 0.35% by mass or less, and furthermore preferably 0.20% by mass or more to 0.26% by mass or less. These make it possible to further enhance the above-described mechanical properties of the vehicle stabilizer 1.

Silicon (Si) is a component contributing to, for example, enhancements of mechanical strength and hardness. Moreover, the component is also added for the deoxidation in making a steel from the steel material. When Si is 0.05% by mass or more, favorable mechanical strength, hardness, corrosion resistance, and sag resistance can be ensured. On the other hand, when Si is 0.40% by mass or less, decreases in toughness and processability can be suppressed. The Si content is preferably 0.15% by mass or more to 0.30% by mass or less.

Manganese (Mn) is a component contributing to, for example, enhancements of hardenability and mechanical strength. Moreover, the component is also added for the deoxidation in making a steel from the steel material. When Mn is 0.50% by mass or more, favorable mechanical strength and hardenability can be ensured. On the other hand, when Mn is 1.70% by mass or less, decreases in toughness and corrosion resistance due to microsegregation and a decrease in processability can be suppressed. The Mn content is more preferably 0.60% by mass or more to 1.50% by mass or less, and furthermore preferably 0.80% by mass or more to 1.50% by mass or less.

Boron (B) is a component contributing to, for example, enhancements of hardenability and mechanical strength. When B is 0.0005% by mass or more to 0.003% by mass or less, a favorable hardenability can be ensured. Moreover, strengthening grain boundaries makes it possible to enhance toughness and corrosion resistance. On the other hand, the B content exceeding 0.003% by mass does not further increase the effect of enhancing the hardenability, and the mechanical properties deteriorate. Hence, the upper limit of the content is limited.

Phosphorus (P) is an unavoidable impurity remaining since making a steel from the steel material. When P is 0.040% by mass or less, decreases in toughness and corrosion resistance due to segregation can be suppressed. The P content is more preferably 0.030% by mass or less.

Sulfur (S) is an unavoidable impurity remaining since making a steel from the steel material. When S is 0.040% by mass or less, decreases in toughness and corrosion resistance due to segregation or MnS-based inclusion precipitation can be suppressed. The S content is more preferably 0.030% by mass or less.

Nickel (Ni) is a component contributing to, for example, enhancements of corrosion resistance and hardenability. Adding Ni makes it possible to ensure favorable corrosion resistance and hardenability, and to reduce corrosion deterioration and quenching crack. On the other hand, excessively incorporating Ni does not further increase the effect of enhancing the hardenability, but increases the material cost. Hence, Ni is preferably 0.30% by mass or less, or does not have to be added to the composition on purpose.

Chromium (Cr) is a component contributing to, for example, enhancements of strength, corrosion resistance, and hardenability. Adding Cr makes it possible to enhance the strength, corrosion resistance, and hardenability. On the other hand, excessively incorporating Cr causes the toughness and corrosion resistance to decrease due to carbide segregation and the processability to decrease, and also increases the material cost. Hence, Cr is preferably 1.20% by mass or less, may be 0.60% by mass or less, or does not have to be added to the composition on purpose.

Copper (Cu) is a component contributing to, for example, enhancements of hardenability and corrosion resistance. Adding Cu makes it possible to enhance the hardenability and corrosion resistance. Nevertheless, excessively incorporating Cu causes hot shortness on the surface in some cases. Hence, Cu is preferably 0.30% by mass or less, or does not have to be added to the composition on purpose.

Molybdenum (Mo) is a component contributing to, for example, enhancements of hardenability, toughness, and corrosion resistance. Adding Mo makes it possible to enhance the hardenability, toughness, and corrosion resistance. Nevertheless, excessively incorporating Mo increases the material cost. Hence, Mo is preferably 0.08% by mass or less, more preferably 0.02% by mass or less, or does not have to be added to the composition on purpose.

Vanadium (V) is a component contributing to, for example, enhancements of toughness and hardness, and bonds to nitrogen (N), thereby preventing N from immobilizing boron (B). Adding V makes it possible to enhance the toughness and hardness, and effectively exhibit the effect of boron (B). On the other hand, excessively incorporating V causes the toughness and corrosion resistance to decrease due to carbonitride precipitation, and also increases the material cost. Hence, V is preferably 0.30% by mass or less, or does not have to be added to the composition on purpose.

Titanium (Ti) is a component contributing to, for example, enhancements of strength and corrosion resistance, and bonds to nitrogen (N), thereby preventing N from immobilizing boron (B). Adding Ti makes it possible to enhance the strength and corrosion resistance, and effectively exhibit the effect of boron (B). On the other hand, excessively incorporating Ti causes the toughness and corrosion resistance to decrease due to carbonitride precipitation in some cases. Hence, Ti is preferably 0.05% by mass or less, or does not have to be added to the composition on purpose.

Niobium (Nb) is a component contributing to, for example, enhancements of strength and toughness, and bonds to nitrogen (N), thereby preventing N from immobilizing boron (B). Adding Nb makes it possible to enhance the strength and toughness through size reduction of crystal grains, and effectively exhibit the effect of boron (B). On the other hand, excessively incorporating Nb causes the toughness and corrosion resistance to decrease due to carbonitride precipitation in some cases. Hence, Nb is preferably 0.06% by mass or less, or does not have to be added to the composition on purpose.

Aluminum (Al) is a component contributing to, for example, an enhancement of toughness, and bonds to nitrogen (N), thereby preventing N from immobilizing boron (B).

Moreover, the component is also added for the deoxidation in making a steel from the steel material. Adding Al makes it possible to enhance the strength and toughness through size reduction of crystal grains, and effectively exhibit the effect of boron (B). On the other hand, excessively incorporating Al toughness and corrosion resistance may decrease due to nitride or oxide precipitation. Hence, Al is preferably 0.30% by mass or less, or does not have to be added to the composition on purpose. This Al means Soluble Al.

Nitrogen (N) is an unavoidable impurity remaining since making a steel from the steel material, but is a component contributing to, for example, an enhancement of strength. Incorporating N within a predetermined content range makes it possible to enhance the strength, while avoiding decreases in toughness and corrosion resistance due to nitride precipitation. The N content is preferably 0.02% by mass or less.

Calcium (Ca) is a component contributing to, for example, an enhancement of machinability. Adding Ca makes it possible to further enhance the machinability of the steel material. The Ca content is preferably 0.40% by mass or less, or Ca does not have to be added to the composition on purpose.

Lead (Pb) is a component contributing to, for example, an enhancement of machinability. Adding Pb makes it possible to further enhance the machinability of the steel material. The Pb content is preferably 0.40% by mass or less, or Pb does not have to be added to the composition on purpose.

Metal Structure of Vehicle Stabilizer 1

The vehicle stabilizer 1 has a metal structure whose main phase is martensite in the base body having the above chemical composition. More specifically, 90% or more of the central portion of the traverse cross section of the vehicle stabilizer 1 has a martensite structure, and the base body has a metal structure at least 90% or more of which is a martensite structure.

Since the base body of the vehicle stabilizer 1 is made of the low-carbon-content manganese-boron steel material, a favorable toughness in addition to hardness is achieved in the martensite structure even in the quenched state.

The vehicle stabilizer 1 preferably has a metal structure consisting of the martensite structure as a single phase. Since the manganese-boron steel has a favorable hardenability, it is also possible to quench the vehicle stabilizer 1 so as to have almost entirely the martensite structure by selecting an appropriate cooling rate for the quenching. In other words, the quality of the vehicle stabilizer 1 can be controlled by selecting the material and the production conditions such as the quenching method.

The metal structure of the vehicle stabilizer 1 consisting of the low-carbon-content martensite structure as a single phase makes it possible to enhance the static strength, durability strength, fatigue properties, and so forth. Moreover, since the structure is constituted of the single phase, a local cell is hardly formed in the metal structure, and the corrosion resistance is enhanced.

Figure 4A:
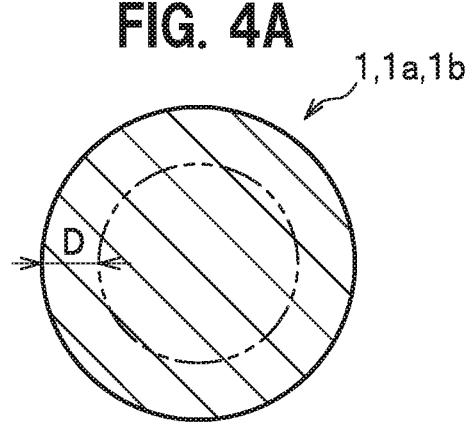
FIG. 4A is a cross-sectional view of the vehicle stabilizer according to the embodiment of the present invention, which is a traverse cross-sectional view of a torsion part or an arm part of the vehicle stabilizer.
Figure 4B:
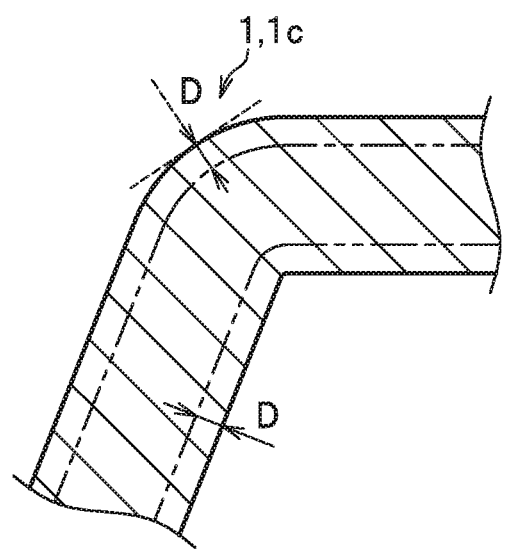
FIG. 4B is a cross-sectional view of the vehicle stabilizer according to the embodiment of the present invention, which is a longitudinal cross-sectional view of a vicinity of a bent portion of the vehicle stabilizer.
Figure 4C:
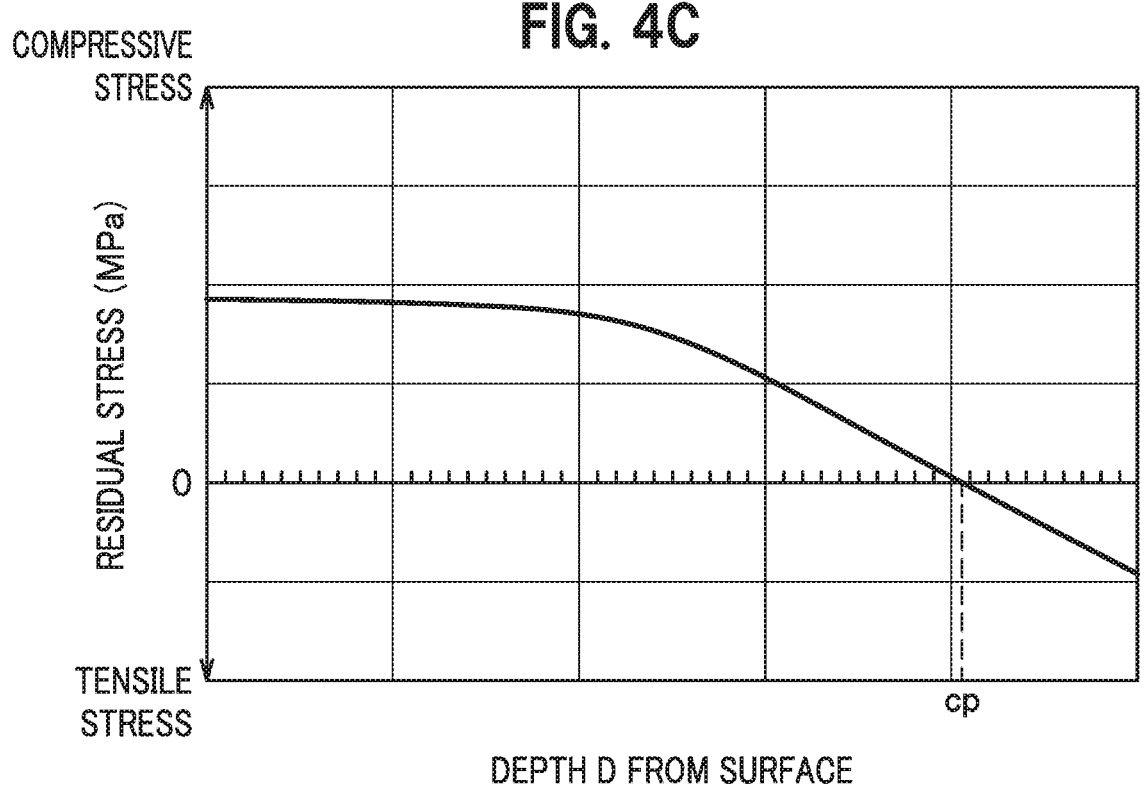
FIG. 4C is a graph for illustrating a crossing point of residual stresses in the vehicle stabilizer according to the embodiment of the present invention.

FIG. 4A is a cross-sectional view of the vehicle stabilizer according to the embodiment of the present invention, which is a traverse cross-sectional view of the torsion part or the arm part of the vehicle stabilizer. FIG. 4B is a cross-sectional view of the vehicle stabilizer according to the embodiment of the present invention, which is a longitudinal cross-sectional view of a vicinity of the bent portion of the vehicle stabilizer. FIG. 4C is a graph for illustrating a crossing point of residual stresses in the vehicle stabilizer according to the embodiment of the present invention, where the horizontal axis represents a depth (dimension) D from the surface of the vehicle stabilizer, and the vertical axis represents the residual stresses in the vehicle stabilizer. It should be noted that FIG. 4C schematically shows the crossing point of the residual stresses in the vehicle stabilizer 1, and does not illustrate real actual properties of the vehicle stabilizer 1.

Note that FIGS. 4A and 4B schematically show cross sections of the base bodies of the torsion part 1*a*, the arm part 1*b*, and the bent portion 1*c* of the vehicle stabilizer 1 (excluding a paint-coating film).

As shown in FIGS. 4A and 4B, in the vehicle stabilizer 1, a compressive residual stress is imparted to the depth (D) from the surface of the base body, which is within a region of a predetermined distance. In addition, the crossing point where the compressive residual stress changes over to a tensile residual stress is located deeper than a depth of 0.8 mm from the surface of the base body (see FIG. 9A of Examples in which tempering and shot peening were not performed, and FIG. 10B of Comparative Example in which tempering and shot peening were performed).

Figure 10A:
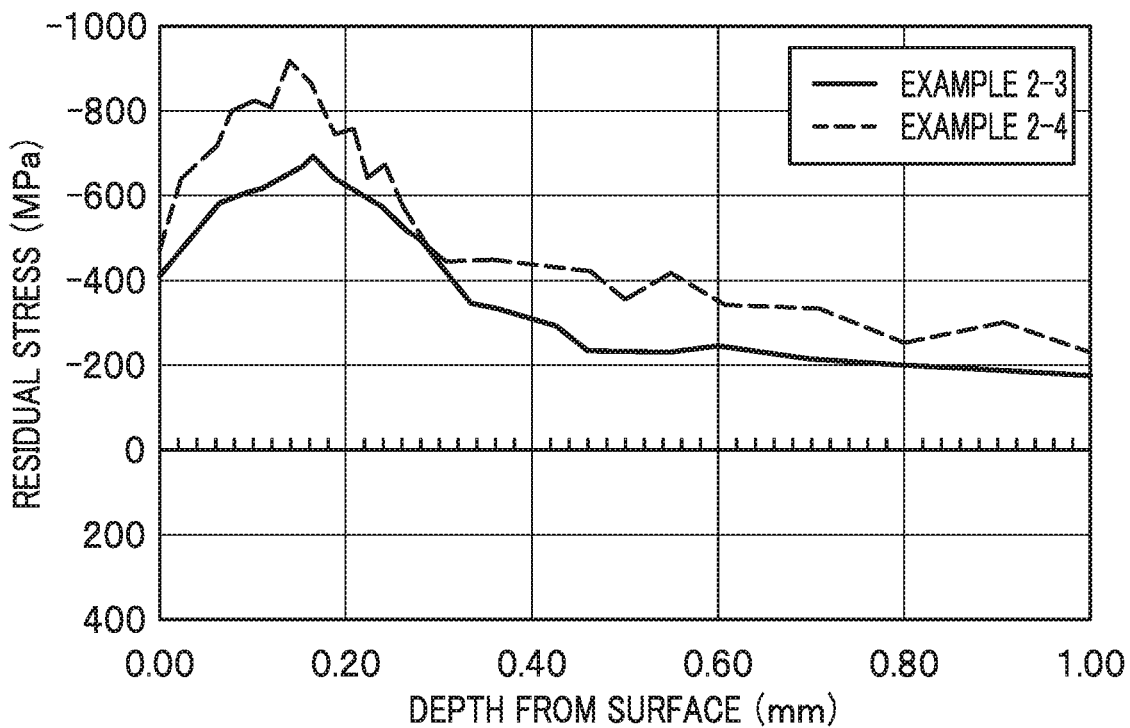
FIG. 10A is a graph for illustrating the measurement result of the surface residual stresses in vehicle stabilizers according to Examples produced by performing shot peening.
Figure 10B:
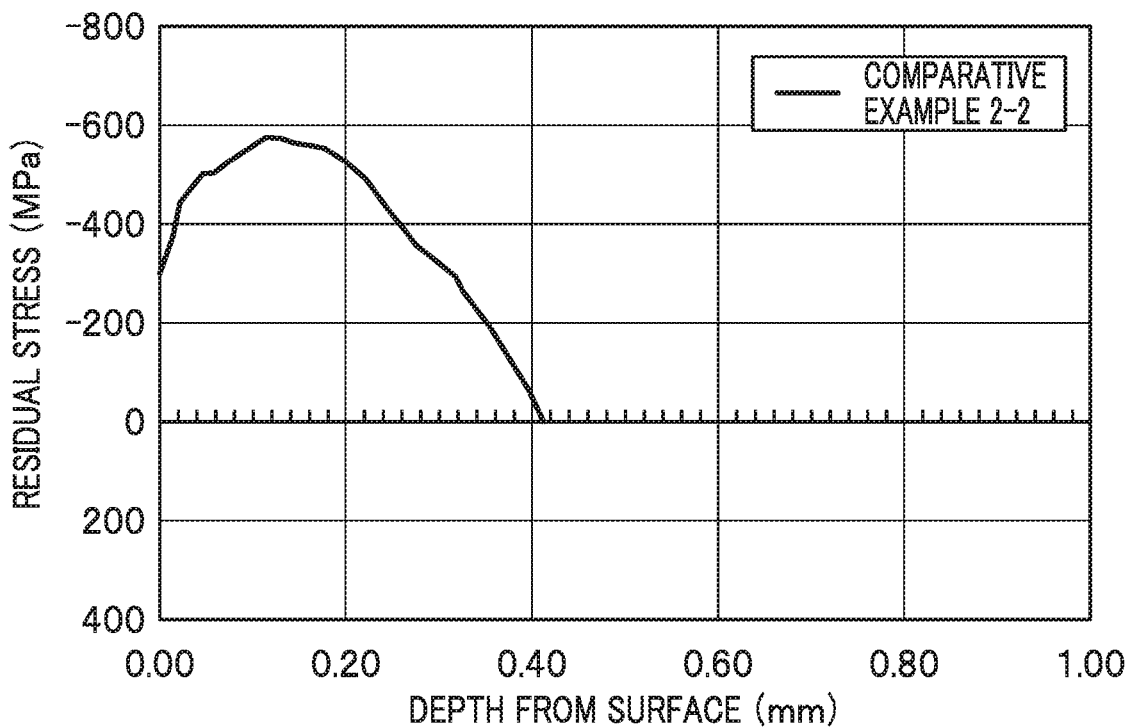
FIG. 10B is a graph for illustrating the measurement result of the surface residual stress in a vehicle stabilizer according to Comparative Example produced by performing shot peening.

From the experimental values in FIG. 10B of Comparative Example in which tempering and shot peening were performed, the crossing point is located approximately 0.42 mm from the surface of the base body. The value of 0.42 mm of Comparative Example relates to a corrosion pit depth which can be as deep as 0.4 mm. The corrosion pit depth is a factor involved in the corrosion durability.

As a corrosion pit grows deeper and reaches a region of a tensile residual stress with no compressive residual stress, fracturing occurs originating from the pit bottom.

Hence, deeply creating a crossing point and increasing a compressive residual stress directly relate to prolonging the corrosion durability.

It is tentatively assumed that the depth of this corrosion pit is 0.4 mm. Nevertheless, in view of safety in consideration of variations among parts, various environmental conditions, operation conditions, and so forth, the crossing point is desirably located deeper than the depth of 0.8 mm as in the present embodiment (see FIG. 9A of Examples in which tempering and shot peening were not performed).

Note that the term crossing point (cp) means a depth where the imparted compressive residual stress changes over to a tensile residual stress as shown in FIG. 4C, that is, a depth where the imparted compressive residual stress is 0 MPa.

The compressive residual stress to the depth of 0.8 mm from the surface of the base body of the vehicle stabilizer 1 preferably has a value of 150 MPa or more under no load. Furthermore preferably, the compressive residual stress at a depth of 1.0 mm from the surface of the base body is 150 MPa or more under no load. The compressive residual stress at such depths can be imparted by increasing the cooling rate in the quenching. Imparting a large compressive residual stress distributed at a deep position suppresses crack propagation in the surface, and makes it possible to greatly enhance the fatigue durability of the vehicle stabilizer 1.

Moreover, since the compressive residual stress is imparted by quenching, the compressive residual stress can be imparted to the entire region of the outer layer of the base body of the vehicle stabilizer 1, and the compressive residual stress is highly uniformly distributed. Note that the entire region of the outer layer means the whole region (outer layer) from each point on the entire surface of the base body to a predetermined depth.

As described above, a point of the present embodiment (the invention of the present application) is that a compressive residual stress of a certain value or larger is present at a certain depth or deeper which a corrosion pit, a factor involved in the corrosion durability, does not reach.

In the vehicle stabilizer 1, the crystal grain size of prior austenite crystal grain boundaries has a grain size number G of preferably more than 8, more preferably 9 or more. Reducing the crystal grain size of prior austenite crystal grain boundaries into such fine levels makes it possible to further enhance the mechanical strength without impairing the toughness. The crystal grain size can be reduced to finer levels by, for example, decreasing the quenching temperature, or increasing the contents of Mn and optional additive elements. Note that the crystal grain size of prior austenite crystal grain boundaries can be measured as described in JAPANESE INDUSTRIAL STANDARD G 0551. The grain size number G can be determined based on a microscope observation image of a metal structure in a quenched state, and desirably determined as an average value of grain size numbers in 5 to 10 fields of view.

Figure 5:
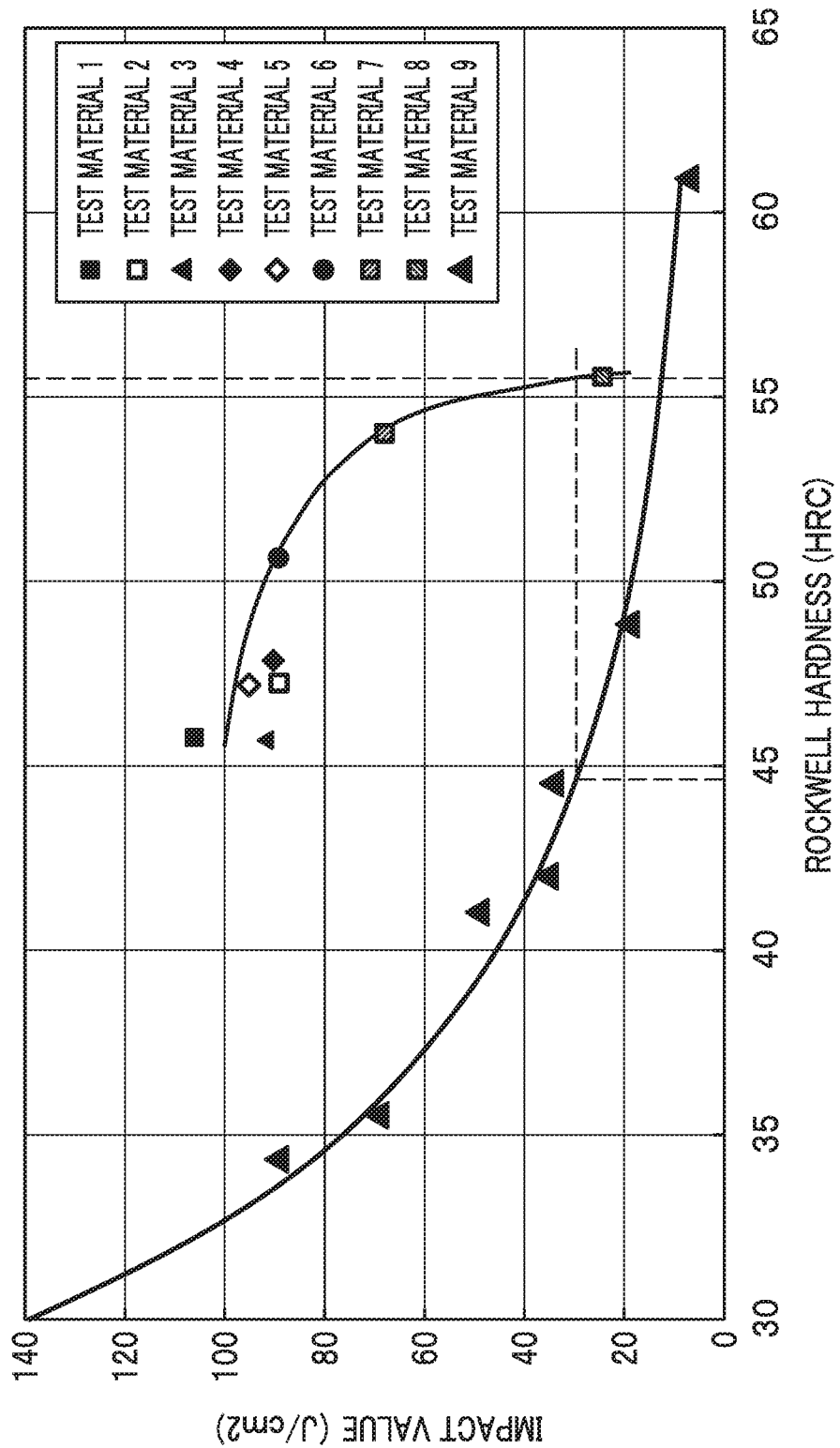
FIG. 5 is a graph for illustrating a correlation between an impact value and the Rockwell hardness of manganese-boron steel materials.

As shown in FIG. 5, the vehicle stabilizer 1 preferably has a Rockwell hardness (HRC) within a range of more than 44.5 to 55.5 or less. FIG. 5 is a graph for illustrating a correlation between an impact value and the Rockwell hardness of manganese-boron steel materials. In FIG. 5, ▲ is data on SUP9N of a conventional stabilizer; ■ is data on 15B23 (Standard American Engineering grades system) of a stabilizer of one example of the present embodiment; and □ is data on 15B25 (Standard American Engineering grades system) of a stabilizer of one example of the present embodiment.

Such a hardness in the Rockwell hardness (HRC) can be achieved with a required toughness when the carbon amount is within a range of 0.15% or more to 0.39% or less in terms of mass. The examples of the vehicle stabilizer 1 (see data ■, □ in FIG. 5), while having a hardness in the Rockwell hardness within the range of more than 44.5 to 55.5 or less, can also have a favorable toughness (for example, a Charpy impact value of 30 J/cm² or more at room temperature with the HRC of 44.5) compared to the stabilizer (see data ▲ in FIG. 5) using the conventional spring steel material as the material thermally refined to have an equivalent hardness.

For example, it can be seen from FIG. 5 that, with the HRC of 44.5, the conventional spring steel material SUP9N (see data ▲ in FIG. 5) has a Charpy impact value of approximately 35 J/cm², while the examples of the vehicle stabilizer 1 (see data on 15B23 ▲ U and 15B25 □ in FIG. 5) obtain Charpy impact values of approximately 90 J/cm² or more.

One Example of Method for Producing Vehicle Stabilizer 1

Next, description will be given of one example of a method for producing the vehicle stabilizer according to the present embodiment.

Figure 6:
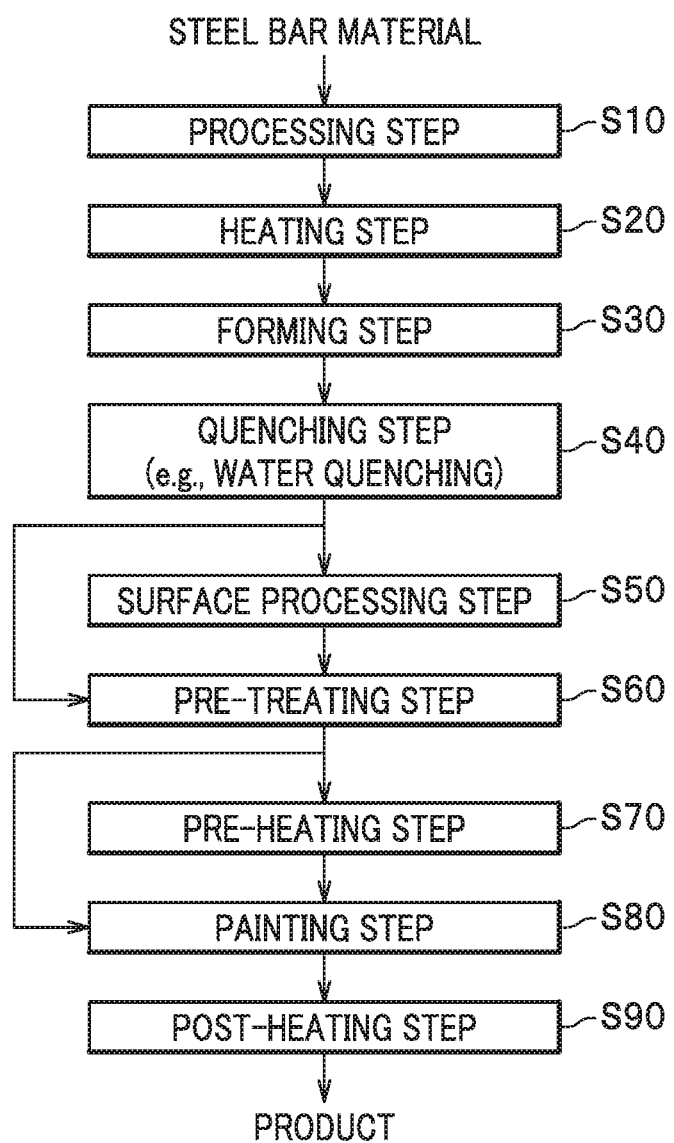
FIG. 6 is a flowchart for illustrating a method for producing the vehicle stabilizer according to the embodiment of the present invention.

FIG. 6 is a flowchart for illustrating a method for producing the vehicle stabilizer according to the embodiment of the present invention.

The method for producing the stabilizer illustrated in FIG. 6 can sequentially include a processing step S10, a heating step S20, a forming step S30, a quenching step S40, a surface processing step S50, a pre-treating step S60, a pre-heating step S70, a painting step S80, and a post-heating step S90. Note that, in this production method, the surface processing step S50 and the pre-heating step S70 are not essential steps, and performing these steps can be omitted as described later.

As the material of the vehicle stabilizer 1, a steel bar material of the above-described low-carbon-content manganese-boron steel is used. The steel bar material is a bar-shaped metal material having a solid structure.

As the steel bar material, specifically, a hot rolled steel material is applicable. The length and the diameter of the steel bar material can be adjusted to appropriate dimensions depending on a desired product shape. Nevertheless, the diameter of the torsion part 1a is within a range of approximately 10 mm to approximately 32 mm.

This hot rolled steel material may be subjected, as necessary, to cold rolling or annealing treatment such as spheroidizing annealing after the hot rolling. Meanwhile, instead of the hot rolled steel material, a cold rolled steel material can also be used. When the hot rolling is performed, the heating temperature of a slab is preferably approximately 1150° C. or more to 1350° C. or less, and the finishing temperature is preferably 800° C. or more to 1000° C. or less.

Setting the finishing temperature to 800° C. or more makes it possible to form the component elements in an appropriate solid solution, and to effectively obtain the effect of enhancing the hardenability by boron in the solid solution. Moreover, setting the finishing temperature to 1000° C. or less makes it possible to prevent the formation of coarse austenite crystal grains, and to inhibit a decrease in hardness and season cracking due to retained austenite. The drawing temperature can be, for example, 400° C. or more to 650° C. or less or so.

The processing step S10 is a step of processing two end portions of the steel bar material, which is the material of the vehicle stabilizer 1, to form the connection portions 1d, 1d to be connected to the stabilizer links 2 (see FIG. 1). The length and the diameter of the steel bar material can be adjusted to appropriate dimensions depending on a desired product shape. In addition, the form and the formation method of the connection portions 1d, 1d are not particularly limited. For example, the connection portions 1d, 1d can be formed by forging terminal ends of the steel bar material into flat shapes and perforating the terminal ends by pressing or the like.

The heating step S20 is a step of heating the steel bar material for the hot bending process. As the heating method, it is possible to employ an appropriate method such as heating in a heating furnace, electrical heating, or high-frequency induction heating. High-frequency induction heating is preferable. Rapid heating utilizing high-frequency induction heating can heat the steel bar material while suppressing decarburization and boron removal. Since the manganese-boron steel material having a favorable hardenability is adopted as the material of the present vehicle stabilizer 1, rapid heating utilizing high-frequency induction heating is applicable.

The forming step S30 is a step of subjecting the heated steel bar material to hot bending to form the material into a product shape. Specifically, the steel bar material is bent to form the torsion part 1a and the arm parts 1b on the steel bar material, and the steel bar material is shaped to form the vehicle stabilizer 1 into a desired shape. Note that the bending can be performed at multiple positions such that multiple bent portions 1c are formed depending on the desired product shape, and the torsion part 1a and the arm parts 1b can also be formed by multiple bending.

The quenching step S40 is a step of quenching the bent steel bar material by using a medium having a heat transfer coefficient equal to or higher than that of water or close to that of water. Specifically, in this step, after the bent steel bar material is austenitized, quenching is performed at a lower-critical cooling rate or faster.

The medium preferably has a heat transfer coefficient within a range of ±10% of the heat transfer coefficient value of still water or running water with respect to the steel bar material. The quenching temperature, the heating rate, and the quenching continuing time can be set within appropriate ranges. For example, the quenching temperature can be 850° C. or more to 1100° C. or less or so. Nevertheless, the quenching temperature is preferably an austenitizing temperature (AC3)+100° C. or less from the viewpoints of avoiding the formation of excessively coarse austenite crystal grains and the generation of quenching crack. After such heating, the steel bar material is cooled using a coolant to make the metal structure of the steel bar material martensite, and to impart a compressive residual stress to the entire region of the surface of the steel bar material (base body).

As the quenching treatment, specifically, water quenching, aqueous solution quenching, or salt water quenching is preferably performed. The water quenching is a quenching treatment using water as the coolant. The water temperature can be set within a temperature range of approximately 0° C. or more to 100° C. or less, preferably 5° C. or more to 40° C. or less. The aqueous solution quenching (polymer quenching) is a quenching treatment using, as the coolant, an aqueous solution to which a polymer is added.

As the polymer, various polymers can be used such as, for example, polyalkylene glycols and polyvinylpyrrolidone. The polymer concentration is not particularly limited, as long as the above-described predetermined heat transfer coefficient is exhibited. The polymer concentration can be adjusted depending on the type of the polymer, the quenching target of the steel bar material to be treated, and so forth.

The salt water quenching is a quenching treatment using, as the coolant, an aqueous solution to which a salt such as sodium chloride is added. The salt concentration is not particularly limited, as long as the above-described predetermined heat transfer coefficient is exhibited. The salt concentration can be adjusted depending on the degree of quenching the steel bar material to be treated. In these quenching treatments, the coolant may be stirred or may not be stirred. Additionally, these quenching treatments may be performed in the form of restraint quenching, fog quenching, spray quenching, or the like.

In the vehicle stabilizer 1 according to the present embodiment, the steel bar material thus quenched (hereinafter also referred to as half-finished product of the vehicle stabilizer 1) can be subjected to the surface processing step S50 or the pre-treating step S60 without performing tempering. This is because the adopted low-carbon-content manganese-boron steel achieves favorable toughness, hardness, and so forth even in the quenched state.

The surface processing step S50 is a step of performing shot peening on the quenched steel bar material. Either hot or cold shot peening may be performed as the shot peening. The shot peening may be repeated multiple times while changing conditions such as particle diameters and shot rate. Performing such shot peening adds a compressive residual stress to the surface of the steel bar material, enhances the fatigue strength and the wear resistance, and prevents season cracking, stress corrosion cracking, and the like. It should be noted that the quenched steel bar material can also be subjected to no shot peening. Specifically, as shown in FIG. 6, it is also possible to perform the pre-treating step S60 after the quenching step S40 without performing such a plastic deformation process as shot peening for imparting a compressive residual stress to the outer layer.

The pre-treating step S60 is a step of performing surface washing and surface treatment for painting the steel bar material. Specifically, in this step, various pre-treatments are performed on the surface of the steel bar material, such as a base treatment, a removal treatment for removing an oil or fat component, a foreign matter, and the like. As the base treatment, for example, a coating of zinc phosphate, iron phosphate, or the like can be formed.

After each treatment of the removal treatment, base treatment and the like, the steel bar material is washed with water. After the water washing, various post-treatments are sequentially performed. As the method for dewatering the steel bar material washed with water, for example, it is possible to utilize an appropriate method such as drying through water absorption using a dewatering roller or the like, blow drying, heat drying, or a combination thereof. The steel bar material thus pre-treated can be subjected to the pre-heating step S70 or the painting step S80 as shown in FIGS. 2A and 2B.

The pre-heating step S70 is a step of pre-heating the steel bar material. Pre-heating in advance the steel bar material to be painted makes it possible to shorten the paint baking time by post-heating, and enhance the painting efficiency. Moreover, it is possible to prevent an excessive temperature rise of a paint at the surface side, so that the adhesion of a coating film can be enhanced. As the heating method, it is possible to employ an appropriate method such as heating in a heating furnace, electrical heating, or high-frequency induction heating. From the viewpoints that the heating rate is fast and that the equipment is simple, electrical heating is preferable. The pre-heating temperature is preferably, for example, within a range of 180° C. or more to 200° C. or less where the coating with a paint is possible. Pre-heating at such a temperature makes it possible to obtain an effect from low-temperature annealing without impairing the hardness, and eliminates the need for a re-cooling treatment to the coating temperature of the paint after the low-temperature annealing. Note that in the case where dewatering is performed by heat drying in the pre-treating step S60, the residual heat after the heat drying can also be utilized for the coating with the paint. Hence, when the heat drying temperature in the dewatering is sufficiently high, it is also possible to perform the painting step S80 after the pre-treating step S60 without performing the pre-heating step S70.

The painting step S80 is a step of painting the steel bar material using a paint. As the paint, a powder paint is preferably used. For example, an epoxy-resin powder paint can be suitably used. As the painting method, for example, it is possible to employ: a method in which a paint is sprayed such that a coating film having a thickness of approximately 50 μm or more is formed on the surface of the steel bar material; or a method in which the steel bar material is immersed in a paint.

The post-heating step S90 is a step of heating and baking the painted paint. As the heating method, heating in a heating furnace is preferable. The post-heating temperature is preferably, for example, within a range of 180° C. or more to 200° C. or less. Specifically, for example, post-heating at 180° C. for 5 minutes or post-heating at 200° C. for 5 minutes is acceptable to the steel bar material painted with the paint. This is because such heating conditions make it possible to avoid decreases in strength and hardness which would otherwise occur by heating the half-finished product of the vehicle stabilizer 1. Note that electrodeposition painting, solvent painting, or the like may be performed as the painting treatment in place of the pre-heating step S70, the painting step S80, and the post-heating step S90.

Through the above-described steps, the vehicle stabilizer 1 can be produced.

In such a production method, tempering is not performed after the quenching. Accordingly, it is not necessary to install a long and large tempering furnace on a production line, making it possible to produce the vehicle stabilizer 1 on a compact production line with high productivity. This enables scaling down of equipment involved in the vehicle stabilizer production, and reductions of the number of man-hours involved in the tempering treatment and the operation cost such as heating cost involved in tempering heating.

Thus, it is possible to greatly reduce the cost of the production line of the vehicle stabilizer 1, and reduce the production cost of the vehicle stabilizer 1.

Moreover, the production line of the vehicle stabilizer 1 can be constructed easily. For example, the production line of the vehicle stabilizer 1 can be easily constructed near production sites of vehicle manufacturers.

Further, quenching using a medium having a heat transfer coefficient equal to or higher than that of water or close to that of water is adopted such as water quenching, aqueous solution quenching, or salt water quenching, in place of oil quenching conventionally performed in general vehicle-stabilizer productions. This eliminates the needs for the control, security, and disposal cost of oil-based coolants such as mineral oils, and the vehicle stabilizer 1 can be produced efficiently.

Examples

Hereinafter, the present invention will be described in more details by way of Examples of the present invention. However, the technical scope of the present invention is not limited thereto.

First, steel materials having chemical component compositions shown in the following Table 1 (test materials 1 to 9) were evaluated for the hardness and the correlation between an impact value and a carbon amount. Note that the test materials 1 to 8 are manganese-boron steel materials, while the test material 9 is a conventional spring steel material (SUP9A ("SUP9N")).

TABLE 1

| Test Material | C | Si | Mn | Cr | P | S | Cu | Ni | Mo | B |
|---|---|---|---|---|---|---|---|---|---|---|
| 1 | 0.2 | 0.19 | 0.94 | 0.35 | 0.016 | 0.007 | 0.16 | 0.06 | — | 0.0019 |
| 2 | 0.24 | 0.19 | 0.88 | 0.24 | 0.014 | 0.011 | 0.08 | 0.05 | 0.01 | 0.0023 |
| 3 | 0.25 | 0.2 | 0.9 | 0.24 | 0.014 | 0.014 | 0.12 | 0.07 | 0.01 | 0.0021 |
| 4 | 0.25 | 0.3 | 1.33 | 0.13 | 0.022 | 0.003 | 0.21 | 0.07 | 0.018 | 0.0013 |
| 5 | 0.28 | 0.19 | 0.87 | 0.014 | 0.014 | 0.013 | 0.14 | 0.07 | 0.01 | 0.0019 |
| 6 | 0.31 | 0.05 | 0.95 | 0.41 | 0.007 | 0.004 | 0.06 | 0.04 | — | 0.0018 |
| 7 | 0.35 | 0.2 | 0.96 | 0.17 | 0.013 | 0.024 | 0.17 | 0.05 | — | 0.0022 |
| 8 | 0.39 | 0.2 | 0.81 | 0.13 | 0.022 | 0.006 | 0.2 | 0.05 | — | 0.002 |
| 9 | 0.57 | 0.2 | 0.88 | 0.87 | 0.013 | 0.015 | 0.08 | 0.06 | — | — |

In the impact test, a JAPANESE INDUSTRIAL STANDARD No. 3 piece (U notch 2 mm in depth) was sampled from each of the test materials and used to determine the impact value uE20 (J/cm$^2$). Note that the test materials were each prepared in the form of steel ingot from a steel made of the composition shown in Table 1, and welded to a square billet to obtain a hot rolled material. Then, a steel bar material was sampled from this hot rolled material and subjected to water quenching. The resultant was used as the sample of the test piece.

As shown in FIG. 5, with the practical hardness upper limit (HRC: 44.5) of vehicle stabilizers, the impact value of the conventional spring steel material as the test material 9 stays at approximately 30 J/cm$^2$ (shown by the broken line in the graph). In contrast, within a HRC range of 44.5 or more to 56 or less, the manganese-boron steel materials as the test materials 1 to 8 had impact values more than approximately 30 J/cm$^2$ with the practical hardness upper limit (HRC: 44.5) to HRC 56 of the vehicle stabilizers of the test material 9. It can be seen that both the mechanical strength and the toughness can be achieved.

Figure 7:
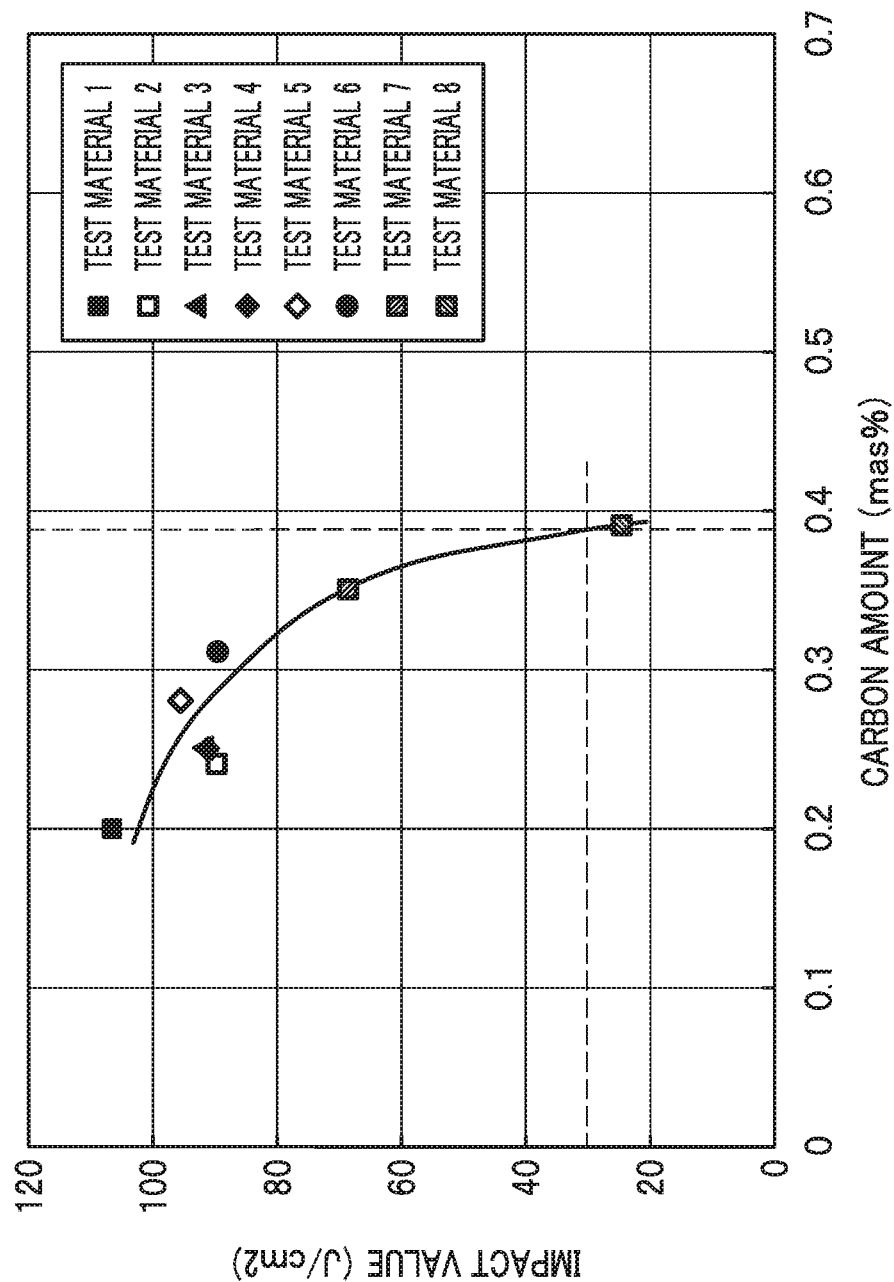
FIG. 7 is a graph for illustrating a correlation between an impact value and the carbon amount of manganese-boron steel materials.

FIG. 7 is a graph for illustrating a correlation between an impact value and the carbon amount of manganese-boron steel materials.

Moreover, as shown in FIG. 7, the impact values of the manganese-boron steel materials were shown to be negatively correlated with the carbon amounts (% by mass) of the test materials. It can be seen that the toughness mainly depends on the carbon amount. Further, the manganese-boron steel materials as the test materials 1 to 8 had impact values more than the value of the impact value (30 J/cm$^2$) observed in the test material 9 within a carbon-amount range of 0.39% by mass or less (shown by the broken line in the graph). Thus, it was found that a manganese-boron steel having a carbon amount of 0.39% by mass or less is suitable as the material of a vehicle stabilizer.

Next, vehicle stabilizers according to Examples 1-1 to 1-3 were produced and evaluated for the durability. Moreover, as a control, a vehicle stabilizer according to Comparative Example 1 was produced and also evaluated.

Example 1-1

Using the test material 1 shown in Table 1 as the material, the vehicle stabilizer according to Example 1-1 was produced by carrying out the forming step S30 by cold bending process and the quenching step S40 by water quenching without performing tempering. Note that the vehicle stabilizer had a diameter of 23 mm.

Example 1-2

The vehicle stabilizer according to Example 1-2 was produced in the same manner as in Example 1-1, except that the material was changed to the test material 4 shown in Table 1.

Example 1-3

The vehicle stabilizer according to Example 1-3 was produced in the same manner as in Example 1-1, except that the forming step S30 was changed to hot bending process.

Comparative Example 1

Using the test material 9 shown in Table 1 as the material, the vehicle stabilizer according to Comparative Example 1 was produced by performing tempering after the oil quenching. Note that the vehicle stabilizer had a diameter of 23 mm.

Then, each of the produced vehicle stabilizers was subjected to the durability test. In the durability test, with two ends of the vehicle stabilizer being immobilized, predetermined stresses were repeatedly loaded to determine the completely reversed fatigue limit (fatigue strength).

FIG. 8 shows an S-N curve of the vehicle stabilizers according to Examples.

As shown in FIG. 8, it can be seen that all of the vehicle stabilizers according to Examples 1-1 to 1-3 had enhanced durabilities compared to the vehicle stabilizer according to Comparative Example 1 which is shown by the solid line. Moreover, the fatigue limit of the vehicle stabilizer according to Example 1-1 (♦) was equivalent to that of the vehicle stabilizer according to Example 1-3 (◊). It was found that both of hot bending and cold bending can be adopted.

Next, vehicle stabilizers according to Examples 2-1 to 2-4 were produced and evaluated for the surface residual stress. Moreover, as comparison controls, vehicle stabilizers according to Comparative Examples 2-1 to 2-2 were produced and also evaluated.

Example 2-1

Using the test material 1 shown in Table 1 as the material, the vehicle stabilizer according to Example 2-1 was produced by carrying out the forming step S30 and the quenching step S40 by water quenching without performing shot peening (the surface processing step S50).

Example 2-2

The vehicle stabilizer according to Example 2-2 was produced in the same manner as in Example 2-1, except that the material was changed to the test material 4 shown in Table 1.

Example 2-3

Using the test material 1 shown in Table 1 as the material, the vehicle stabilizer according to Example 2-3 was produced by carrying out the forming step S30, the quenching step S40 by water quenching, and the surface processing step S50 by shot peening.

Example 2-4

The vehicle stabilizer according to Example 2-4 was produced in the same manner as in Example 2-3, except that the material was changed to the test material 4 shown in Table 1.

Comparative Example 2-1

Using the test material 9 shown in Table 1 as the material, the vehicle stabilizer according to Comparative Example 2-1 was produced without performing tempering and shot peening after oil quenching.

Comparative Example 2-2

Using the test material 9 shown in Table 1 as the material, the vehicle stabilizer according to Comparative Example 2-2 was produced by performing tempering and shot peening after oil quenching.

Compressive Residual Stress

Figure 9A:
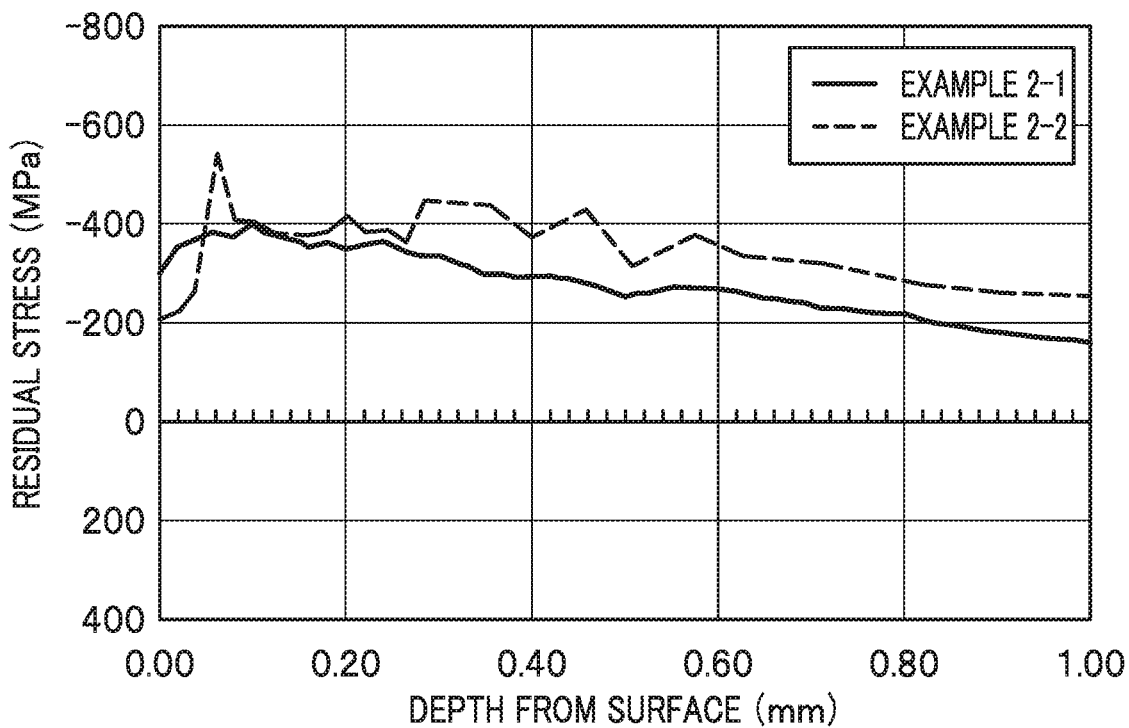
FIG. 9A is a graph for illustrating the measurement result of the surface residual stresses in vehicle stabilizers according to Examples produced without performing shot peening.
Figure 9B:
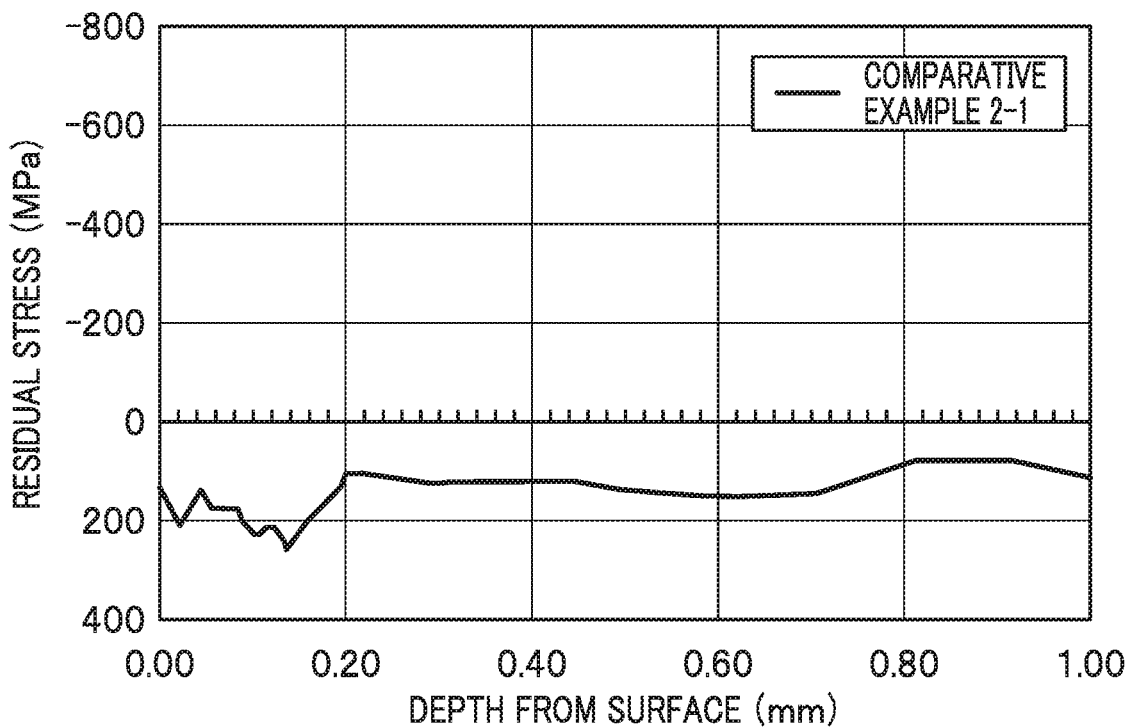
FIG. 9B is a graph for illustrating the measurement result of the surface residual stress in a vehicle stabilizer according to Comparative Example produced without performing shot peening.

FIG. 9A is a graph for illustrating the measurement result of the surface residual stresses in the vehicle stabilizers according to Examples produced without performing shot peening. FIG. 9B is a graph for illustrating the measurement result of the surface residual stress in the vehicle stabilizer according to Comparative Example produced without performing shot peening.

FIG. 10A is a graph for illustrating the measurement result of the surface residual stresses in the vehicle stabilizers according to Examples produced by performing shot peening. FIG. 10B is a graph for illustrating the measurement result of the surface residual stress in the vehicle stabilizer according to Comparative Example produced by performing shot peening.

In each of FIGS. 9A, 9B, 10A, and 10B, the vertical axis represents a residual stress (MPa). The (−) side is a (compressive) residual stress, and the (+) side is a (tensile) residual stress. As shown in FIG. 9A, it can be seen that even though tempering and shot peening were not performed, the compressive residual stresses were generated and deeply distributed from the surfaces in Examples 2-1 and 2-2 compared to FIG. 9B of Comparative Example. In detail, the crossing point where the compressive residual stress changed over to a tensile residual stress was located a depth of at least 0.8 mm or deeper from the surface. Moreover, the compressive residual stress (compressive residual stress under no load) of 150 MPa or more was found to the depth of 0.8 mm from the surface.

On the other hand, in Examples 2-1 and 2-2, the compressive residual stresses (compressive residual stresses under no load) were 200 MPa or more at the depth of 0.42 mm from the surface, at which the (compressive) residual stress was 0 in FIG. 9B of Comparative Example, and the compressive residual stresses (compressive residual stresses under no load) were 150 MPa or more at the depth of 1.0 mm from the surface.

Further, it can be seen that since the residual stresses are relatively large, an effective compressive residual stress can be imparted by only performing quenching at a fast cooling rate even if shot peening is omitted, with reference to the surface residual stress of the vehicle stabilizer of Comparative Example in FIG. 10B subjected to shot peening. In detail, with reference to FIG. 9A of Examples, the compressive residual stresses (compressive residual stresses under no load) were 200 MPa or more at the depth of 0.42 mm from the surface, at which the (compressive) residual stress was 0 in FIG. 10B of Comparative Example.

In addition, the compressive residual stresses to the depth of 0.8 mm from the surface were 150 MPa or more. Moreover, the compressive residual stresses (compressive residual stresses under no load) were 150 MPa or more at the depth of 1.0 mm from the surface. In contrast, the tensile residual stress was distributed in Comparative Example 2-1 (see FIG. 9B), and it was found that oil quenching hardly makes the generation of the surface residual stress attributable to a thermal stress predominate.

On the other hand, as shown in FIGS. 10A and 10B, it can be seen that, in Examples 2-3 and 2-4 (see FIG. 10A) in which shot peening was performed, the compressive residual stresses at the surface sides were further enhanced compared to Examples 2-1 and 2-2 (see FIG. 9A). In contrast, it was found that, in Comparative Example 2-2 (see FIG. 10B), performing oil tempering and shot peening enhanced the compressive residual stress at the surface side; however, the distribution of the compressive residual stress stayed at the surface side (0.42 mm or less from the surface shown in FIG. 10B). Hence, there is a possibility in the vehicle stabilizer of Comparative Example that a crack originating from the vicinity of the bottom portion of a grown corrosion pit is likely to propagate, so that sufficient fatigue strength and corrosion resistance are not obtained.

As described above, the corrosion pit depth, which is a factor involved in the corrosion durability, can be as deep as 0.4 mm in some cases, and the vehicle stabilizer of Comparative Example 2-2 subjected to shot peening has a risk of having insufficient fatigue strength and corrosion resistance (see FIG. 10B).

Surface Residual Stress, and Carbon Amount and Diameter of Manganese-Boron Steel Material Next, an analysis was performed on correlations of the surface residual stress with the carbon amount and the diameter of the manganese-boron steel materials.

The surface residual stresses of the manganese-boron steel materials were measured from half-finished products of vehicle stabilizers produced using the test materials 1, 2, 6, 7, 8 having different carbon amounts from each other as the respective materials by carrying out the forming step S30 and the quenching step S40 by water quenching without performing tempering. Note that each of the half-finished products was prepared so as to have a diameter within a range of 21 mm to 25 mm. Moreover, a correlation between the surface residual stress and the diameter was estimated by simulating surface residual stresses that may be generated with the diameters when the products were produced by water quenching (water cooling) and when the products were produced by oil quenching (oil cooling).

Figure 11A:
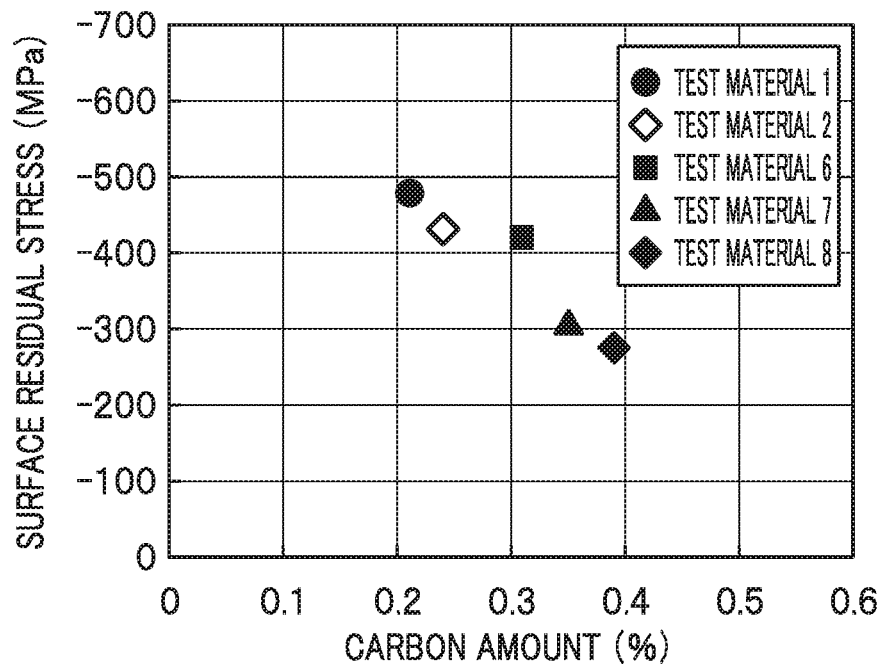
FIG. 11A is a graph for illustrating a relation between the surface residual stress in vehicle stabilizers according to Examples and the carbon amount of the steel materials.
Figure 11B:
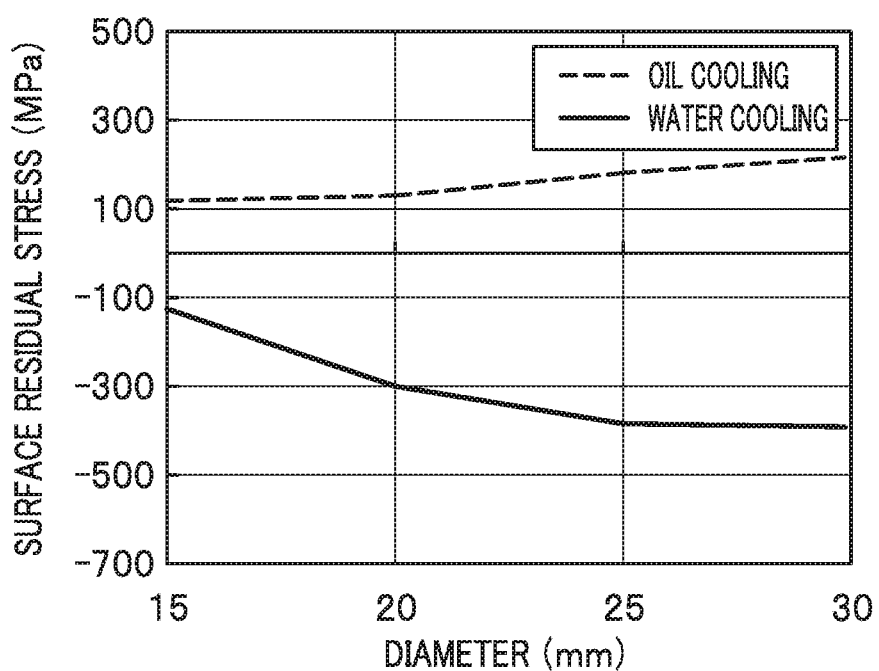
FIG. 11B is a graph for illustrating a relation between the surface residual stress in the vehicle stabilizers according to Examples and the diameter of the steel materials.

FIG. 11A is a graph for illustrating a relation between the surface residual stress in the vehicle stabilizers according to Examples and the carbon amount of the steel materials. FIG. 11B is a graph for illustrating a relation between the surface residual stress in the vehicle stabilizers according to Examples and the diameter of the steel materials.

As shown in FIG. 11A, it can be seen that the smaller the carbon amount, the larger the compressive residual stress imparted to the surface by water quenching, and that the larger the carbon amount, the smaller the stress. Thus, it can be said that when a manganese-boron steel material having a small carbon amount is used to produce a vehicle stabilizer, a vehicle stabilizer having high fatigue strength and corrosion resistance can be produced even if shot peening is omitted. Moreover, as shown in FIG. 11B, while oil quenching generates a tensile residual stress, water quenching generates a compressive residual stress. It can be verified that the stress value becomes sufficient large (approximately 300 MPa or more) with the diameter in a range of 20 mm to 30 mm.

Corrosion Resistance of Vehicle Stabilizer 1

Next, a vehicle stabilizer produced by water quenching using the low-carbon-content manganese-boron steel material as the material was evaluated for the corrosion resistance.

A half-finished product of a vehicle stabilizer (sample 1-1) produced using the test material 1 as the material by carrying out the forming step S30 and the quenching step S40 by water quenching without performing tempering was used as a sample of the corrosion resistance test. Moreover, a half-finished product of a vehicle stabilizer (sample 1-2) using the test material 9, which is the conventional spring steel material, as the material subjected to tempering after oil quenching was used as a control. Note that both had diameters of 14 mm.

As the corrosion resistance test, a cycle test (CCTI) was conducted using the samples each of which was masked other than a region of a diameter of 10 mm×a length of 50 mm as a corrosion surface. Cycles each consisting of salt water spraying at 35° C. 4 times (NaCl concentration: 5%), a drying treatment at 60° C. 2 times, and a wetting treatment at 50° C. and 95% RH 2 times were repeated to measure a corrosion weight loss. Note that the corrosion weight loss was determined by dividing a difference between the weight before the test and the weight after the test by the area of the corrosion surface.

Figure 12:
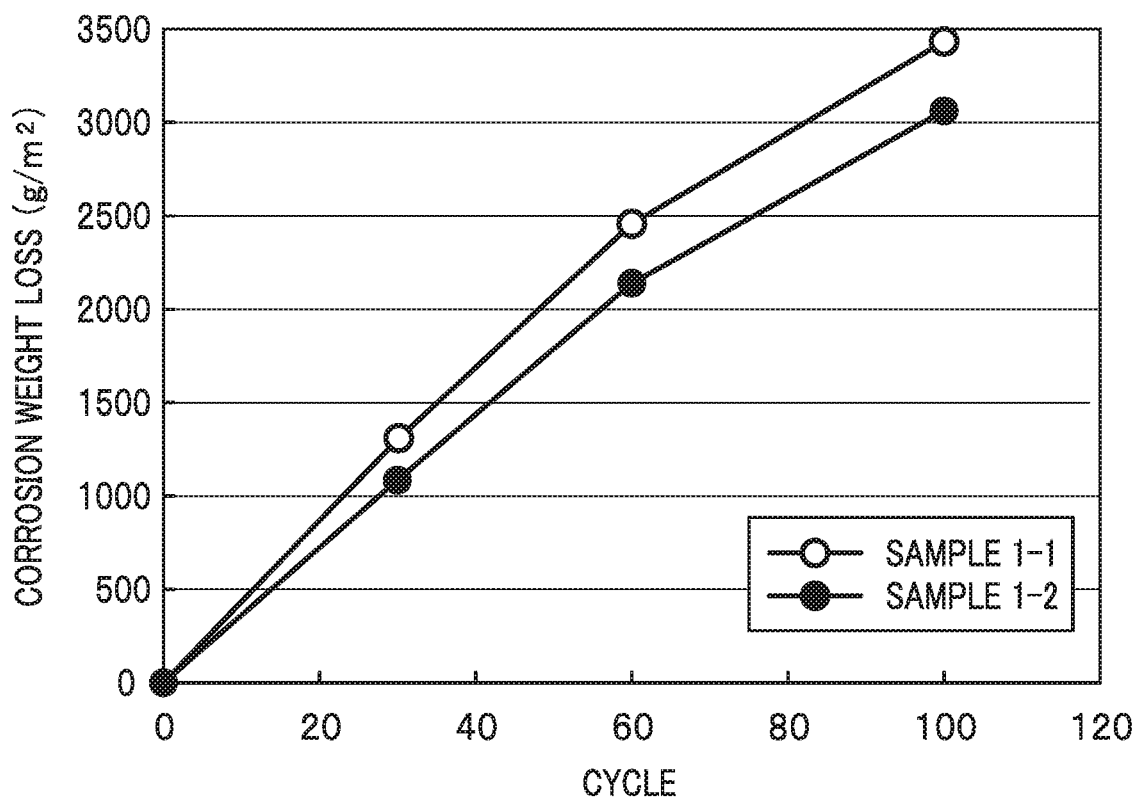
FIG. 12 is a graph for illustrating the result of a corrosion resistance test.

FIG. 12 is a graph for illustrating the result of the corrosion resistance test.

As shown in FIG. 12, it can be seen that the sample 1-1 using the low-carbon-content manganese-boron steel material as the material subjected to water quenching had an enhanced corrosion resistance compared to the sample 1-2 using the conventional spring steel material as the material subjected to tempering after oil quenching. It was found that since troostite or sorbite was formed by tempering in the sample 1-2, the corrosion rate increased compared to the sample 1-1 having a low-carbon-content martensite structure.

Fatigue Crack of Vehicle Stabilizer 1

Next, a vehicle stabilizer produced by water quenching using the low-carbon-content manganese-boron steel material as the material was evaluated for the fatigue crack propagation.

Used as samples of the fracture toughness test were: a half-finished product of a vehicle stabilizer (sample 2-1) using the test material 9, which is the conventional spring steel material, as the material subjected to tempering after oil quenching; and a half-finished product of a vehicle stabilizer (sample 2-2) produced using the test material 1 as the material by carrying out the forming step S30 and the quenching step S40 by water quenching without performing tempering. Note that the hardness of the sample 2-1 was 42.7 (HRC), and the hardness of the sample 2-2 was 45.8 (HRC).

Figure 13:
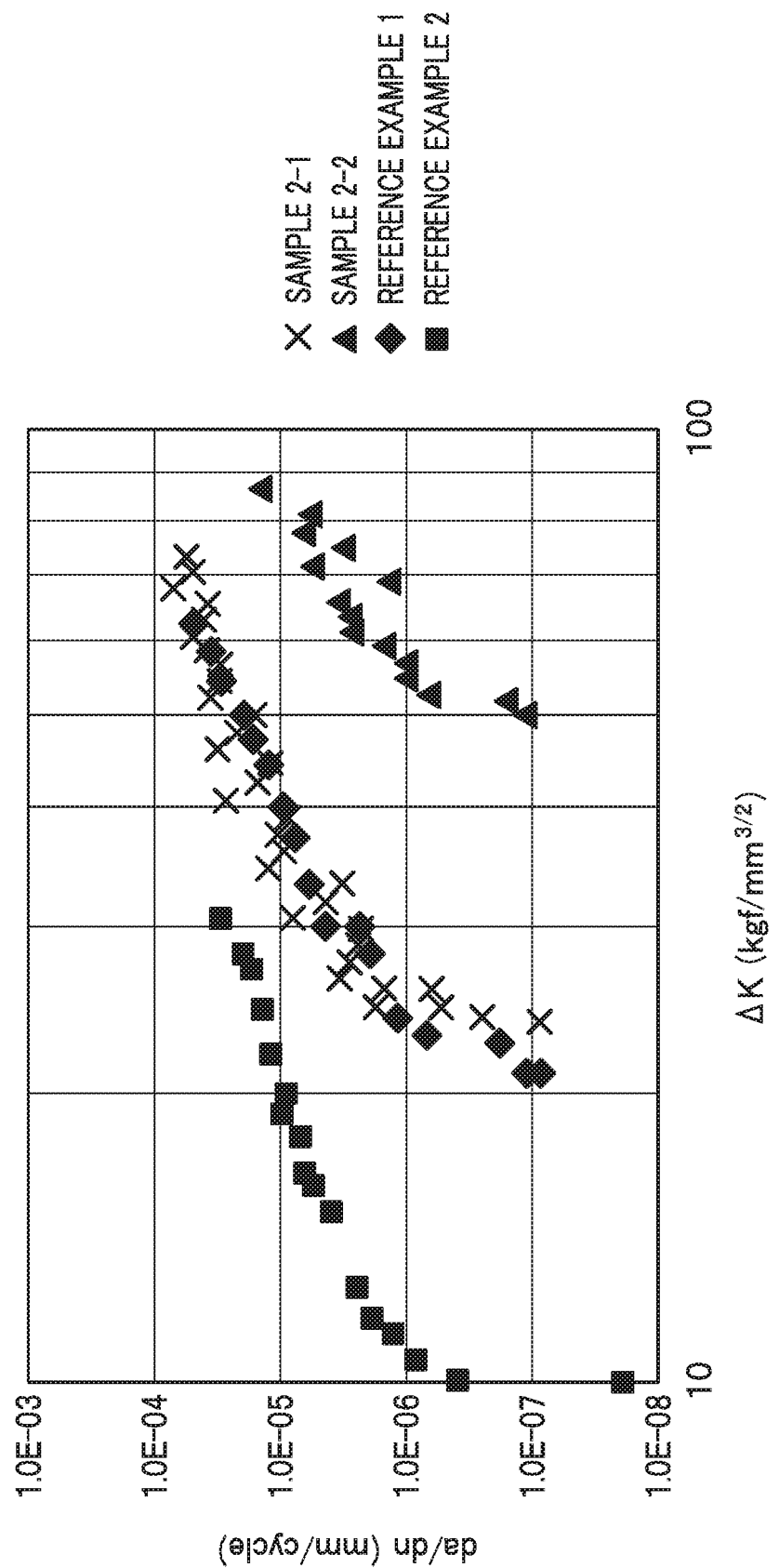
FIG. 13 is a graph for illustrating the result of analyzing fatigue crack propagation.

FIG. 13 is a graph for illustrating the result of analyzing the fatigue crack propagation.

In FIG. 13, the vertical axis represents a fatigue crack propagation rate da/dN (mm/cycle), and the horizontal axis represents a stress intensity factor range $\Delta K$ (kgf/mm$^{3/2}$)× plotted points are of the sample 2-1, ▲ plotted points are of the sample 2-2, ◆ plotted points are of Reference Example 1 (already reported values of SUP7 (HRC: 46.5)), and ■ plotted points are of Reference Example 2 (already reported values of SUP7 (HRC: 61.0)).

As shown in FIG. 13, the fatigue crack propagation rate of the sample 2-2 was approximately 1/10 to 1/100 of that of the sample 2-1. It can be seen that the toughness was favorable compared to Reference Examples 1 and 2 or other conventional spring steel materials. Additionally, the fracture toughness values (Kc) were determined. The Kc of the sample 2-2 was approximately 1.6 times as large as the sample 2-1. It was found that the fatigue durability was also favorable.

OTHER EMBODIMENTS

1. The above embodiment has been described by illustrating the case of using an aqueous coolant having a heat transfer coefficient equal to or higher than that of water or close to that of water. Nevertheless, the type of the medium is not particularly limited, as long as rapid cooling of the quenching target is possible and the vehicle stabilizer 1 has predetermined performances such as mechanical strength, strength, and toughness having been described. For example, the medium may be water or oil having a high heat transfer coefficient, including liquids and solids such as ice and organic solvents. Note that the phase of the medium may be a liquid, a liquid containing the solid, or the like, and is not particularly limited.

2. The above embodiment has been described by illustrating the case where the raw material of the vehicle stabilizer 1 used is a steel bar material containing, in terms of mass, C: 0.15% or more to 0.39 or less, Si: 0.05 or more to 0.40% or less, Mn: 0.50% or more to 1.70% or less, and B: 0.0005% or more to 0.003% or less as essential elements, and P: 0.040% or less and S: 0.040% or less; the steel bar material may optionally contain at least one or more elements selected from the group consisting of Ni, Cr, Cu, Mo, V, Ti, Nb, Al, N, Ca, and Pb each within a range of 1.20% or less as optional additive elements; and the balance includes Fe and unavoidable impurities. Nevertheless, as long as the vehicle stabilizer 1 has predetermined performances such as mechanical strength, strength, and toughness having been described, the raw material of the vehicle stabilizer 1 may be a steel bar material containing at least C: 0.15% by mass or more to 0.39% by mass or less, Mn, B, and Fe. Alternatively, it is possible to use a steel bar material containing at least, in terms of mass, C: 0.15% or more to 0.39% or less, Mn: 0.50% or more to 1.70% or less, B: 0.0005% or more to 0.003% or less, and Fe.

3. In the above embodiment, after the bent steel bar material having been described is austenitized, quenching is performed at a lower-critical cooling rate or faster. The quenching may be performed, for example, by jetting a gas such as cool air to the bent steel bar material for the cooling.

4. The above embodiment has been described by illustrating the case of using the vehicle stabilizer 1 having a solid structure. Nevertheless, the present invention is applicable also to a case of preparing a pipe-shaped hollow stabilizer.

5. In the above embodiment, various configurations have been described. Nevertheless, each configuration may be selected, or each configuration may be selected in combination as appropriate for difference configurations.

6. The above embodiment has been described as one example of the present invention. Various specific modifications can be made to the present invention in the scope of claims or the range described in the embodiments.

REFERENCE SIGNS LIST

1: stabilizer (vehicle stabilizer)
1*a*: torsion part
cp: crossing point
S30: forming step
S40: quenching step

The invention claimed is:

1. A stabilizer formed by using a metal bar having a solid structure, the stabilizer comprising:
   a torsion part extending in a vehicle width direction, and having a diameter of 10 to 32 mm,
   wherein the stabilizer has a chemical composition containing at least C: 0.15% or more to 0.39% or less by mass, at least Mn: 0.50% or more to 1.70% or less by mass, and at least B: 0.0005% or more to 0.0003% or less by mass, and Fe, and also has a metal structure 90% or more of which is a martensite structure, the stabilizer having a Rockwell hardness (HRC) of 44.5 or more, and a Charpy impact value of 30 J/cm$^2$ or more at room temperature, and
   wherein a compress residual stress is present from a stabilizer surface to a depth of at least 0.8 mm, and has a value of 150 MPa or more under no load.

2. The stabilizer according to claim 1, wherein the stabilizer has a Rockwell hardness (HRC) within a range of more than 44.5 to 55.5 or less.

3. The stabilizer according to claim 1, further comprising: in terms of mass, Si: 0.05% or more to 0.40% and P: 0.040% or less and S; 0.040% or less;
   optionally at least one or more elements selected from the group consisting of Ni, Cr, Cu, Mo, V, Ti, Nb, Al, N, Ca, and Pb each within a range of 1.20% or less as optional additive elements; and unavoidable impurities.

\* \* \* \* \*